United States Patent
Scott et al.

(10) Patent No.: US 10,320,802 B1
(45) Date of Patent: *Jun. 11, 2019

(54) METHOD AND SYSTEM FOR IDENTIFYING SECURITY RISKS USING GRAPH ANALYSIS

(71) Applicant: STATE FARM MUTUAL AUTOMOBILE INSURANCE COMPANY, Bloomington, IL (US)

(72) Inventors: Abigail A. Scott, Bloomington, IL (US); Ronald R. Duehr, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/834,626

(22) Filed: Dec. 7, 2017

Related U.S. Application Data

(63) Continuation of application No. 15/611,026, filed on Jun. 1, 2017, now Pat. No. 9,876,801, which is a continuation of application No. 14/603,728, filed on Jan. 23, 2015, now Pat. No. 9,819,685.

(Continued)

(51) Int. Cl.
*H04L 29/06* (2006.01)

(52) U.S. Cl.
CPC .................................. *H04L 63/104* (2013.01)

(58) Field of Classification Search
CPC ... H04L 63/104; H04L 63/08; H04L 63/0815; H04L 63/10; G06F 21/30; G06F 21/44; G06F 21/70

(Continued)

(56) References Cited

U.S. PATENT DOCUMENTS 6,535,227 B1 3/2003 Fox et al.
7,685,206 B1 3/2010 Mathew et al.
(Continued)

FOREIGN PATENT DOCUMENTS

WO WO-2013170346 A1 11/2013

OTHER PUBLICATIONS

Margin adaptive resource allocation in downlink multiuser MIMO-OFDMA system with Multiuser Eigenmode transmission, SPAWC 2008. IEEE 9th Workshop, Hassan et al, IEEE, Jul. 2008.
(Continued)

*Primary Examiner* — Jahangir Kabir
(74) *Attorney, Agent, or Firm* — Marshall, Gerstein & Borun LLP; Randall G. Rueth

(57) ABSTRACT

Methods, systems, apparatus, and non-transitory computer readable media are described for identifying users who are likely to have unauthorized access to secure data files in an organizational network. Various aspects may include presenting the identified users on a display for a system administrator and/or security analyst to resolve. For example, the display may include a graph data structure with users represented as nodes and connections between users represented as edges. Each connection may be a pair of users belonging to the same security group. Nodes of the graph data structure may be clustered to indicate that each of the users in the cluster belong to the same security group. Moreover, the users who are connected to multiple clusters may be identified as a potential risk of having unauthorized access to secure data files. The authorized access may then be remedied or taken away.

18 Claims, 13 Drawing Sheets

Related U.S. Application Data

(60) Provisional application No. 62/089,920, filed on Dec. 10, 2014.

(58) Field of Classification Search
USPC .......................................................... 726/1–4
See application file for complete search history.

(56) References Cited

U.S. PATENT DOCUMENTS

| | | |
|---|---|---|
| 8,793,489 B2 * | 7/2014 | Polunin ................ G06Q 10/047 |
| | | 713/166 |
| 2005/0232423 A1 | 10/2005 | Horvitz et al. |
| 2012/0324592 A1 | 12/2012 | Korablev et al. |
| 2013/0073473 A1 | 3/2013 | Heath |
| 2014/0150072 A1 | 5/2014 | Castro et al. |
| 2015/0135043 A1 | 5/2015 | Apps et al. |
| 2015/0135296 A1 | 5/2015 | Cason et al. |
| 2016/0021116 A1 | 1/2016 | Maguire et al. |

OTHER PUBLICATIONS

Cooperation in multi-access networks via coalitional game theory, Communication, Control, and Computing (Allerton), 2011 49th Annual Allerton Conference, Karamchandanai et al, IEEE, Sep. 2011.

Non-Final Office Action for U.S. Appl. No. 14/603,728, dated Mar. 30, 2016.

Final Office Action for U.S. Appl. No. 14/603,728, dated Sep. 12, 2016.

\* cited by examiner

METHOD AND SYSTEM FOR IDENTIFYING SECURITY RISKS USING GRAPH ANALYSIS

CROSS-REFERENCE TO RELATED APPLICATIONS

This application is a continuation of and claims priority to U.S. application Ser. No. 15/611,026 filed on Jun. 1, 2017, entitled "Method And System For Identifying Security Risks Using Graph Analysis," which claims priority to U.S. application Ser. No. 14/603,728 filed on Jan. 23, 2015, entitled "Method And System For Identifying Security Risks Using Graph Analysis," which claims priority to and the benefit of the filing date of provisional U.S. Patent Application No. 62/089,920, entitled "Method And System For Identifying Security Risks Using Graph Analysis," filed on Dec. 10, 2014, the entire contents of which is hereby expressly incorporated herein by reference.

TECHNICAL FIELD

The present disclosure generally relates to systems, methods, apparatus, and non-transitory computer readable media for information security and, more particularly to identifying users who are likely to have unauthorized access to secure data assets in an organizational computer network.

BACKGROUND

Today, organizational entities such as companies, universities, non-profit organizations, etc., share secure data files amongst members of the organization through communication networks. A person within the organization (a user) may be given a user account through which she is provided access to the communication network. However, the user may not be given permission to access the secure data files directly through her user account, and instead the user account may be assigned to one or several security group(s) based upon her job function. Members of the security groups may have permission to access certain secure data files, and the user account receives permission to access the secure data files based upon being a member of the particular security groups.

When the user changes job roles within the organization, leaves the organization, or no longer has permission to access certain information, the user's corresponding user account may need to be removed from certain security groups. However, this may be a time-consuming, mistake-prone, and difficult process—all of which may lead to many errors and/or oversights allowing the user to have permission to access data that she is no longer authorized to access.

BRIEF SUMMARY

The present embodiments may relate to identifying users having unauthorized access to secure data assets within an organization. Each user within the organization may belong to one or several security groups, where members of a security group have permission to access certain secure data files. The users, as well as the respective security groups to which the users belong, may be displayed in a graph data structure, where users are represented as nodes and two users who belong to the same security group are connected via an edge or line of the graph. In this manner, a system administrator and/or security analyst may see or visualize the users' "connections." The system administrator and/or security analyst may recognize that a particular user is connected to two or more users from disparate security groups.

Based upon the user's connections, the system administrator and/or security analyst may determine that the user may be likely to have unauthorized access to secure data assets, and may further investigate and/or resolve this issue. Moreover, the present embodiments may determine certain attributes of each node in the graph data structure, and/or may automatically recognize which users are likely to have unauthorized access to secure data assets. These users may be highlighted in the display by increasing the size of the nodes corresponding to users who are likely to have unauthorized access relative to the other nodes, and/or by providing a ranking of the users most likely to have unauthorized access on the display.

In one aspect, a computer-implemented method for identifying users of an information security system for determining risk of unauthorized access to secure data assets may be provided. The method may include: (1) identifying (via one or more processors) a plurality of users, wherein each user has a job function related to a role of the user within an organization and/or is associated with an organizational network which contains a plurality of secure data assets and a plurality of security groups, each security group may have permission to access at least one secure data asset. For each of the plurality of users, the method may include: (2) causing (via the one or more processors, and/or wired or wireless communication and/or data transmission) a node of a graph data structure representing the user to be displayed on a user interface of a computing device; (3) identifying (via the one or more processors) a connection between the node of the user and a node of another user of the plurality of users when the user and the other user both correspond to a same security group of the plurality of security groups; and/or (4) causing (via the one or more processors, and/or wired or wireless communication and/or data transmission) the connection between the corresponding node for the user and the other user to be displayed as an edge of the graph data structure on the user interface. For each of a plurality of subsets of the plurality of nodes, the method may include (5) clustering (via the one or more processors and/or wired or wireless communication and/or data transmission) the subset on the user interface to indicate that users in the subset belong to a same security group; and/or (6) determining (via the one or more processors) that a node corresponding to a user which is connected to at least two other nodes in two different clusters has a potential security risk. The method may include additional, fewer, or alternative actions, including those discussed elsewhere herein.

In another aspect, a system for identifying users of an information security system for determining risk of unauthorized access to secure data assets may be provided. The system may include one or more processors, and/or a non-transitory computer-readable memory coupled to the one or more processors and storing machine readable instructions, that when executed by the one or more processors, may cause the system to perform various tasks. For example, the instructions may cause the system to: (1) identify a plurality of users, wherein each user may have a job function related to a role of the user within an organization and/or may be associated with an organizational network which contains a plurality of secure data assets and a plurality of security groups. Each security group may have permission to access at least one secure data asset. For each of the plurality of users, the instructions may cause the system to: (2) cause a node of a graph data structure representing the user to be displayed on a user interface of a computing device; (3) identify a connection between the node of the user and a node of another user of the plurality of users when the user and the other user both correspond to a same security group of the plurality of security groups; and/or (4) cause the connection between the corresponding node for the user and the other user to be displayed as an edge of the graph data structure on the user interface. For each of a plurality of subsets of the plurality of nodes, the instructions may cause the system to: (5) cluster the subset on the user interface to indicate that users in the subset belong to a same security group; and/or (6) determine that a node corresponding to a user which is connected to at least two other nodes in two different clusters has a potential security risk. The system may include additional, fewer, or alternate components and/or functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
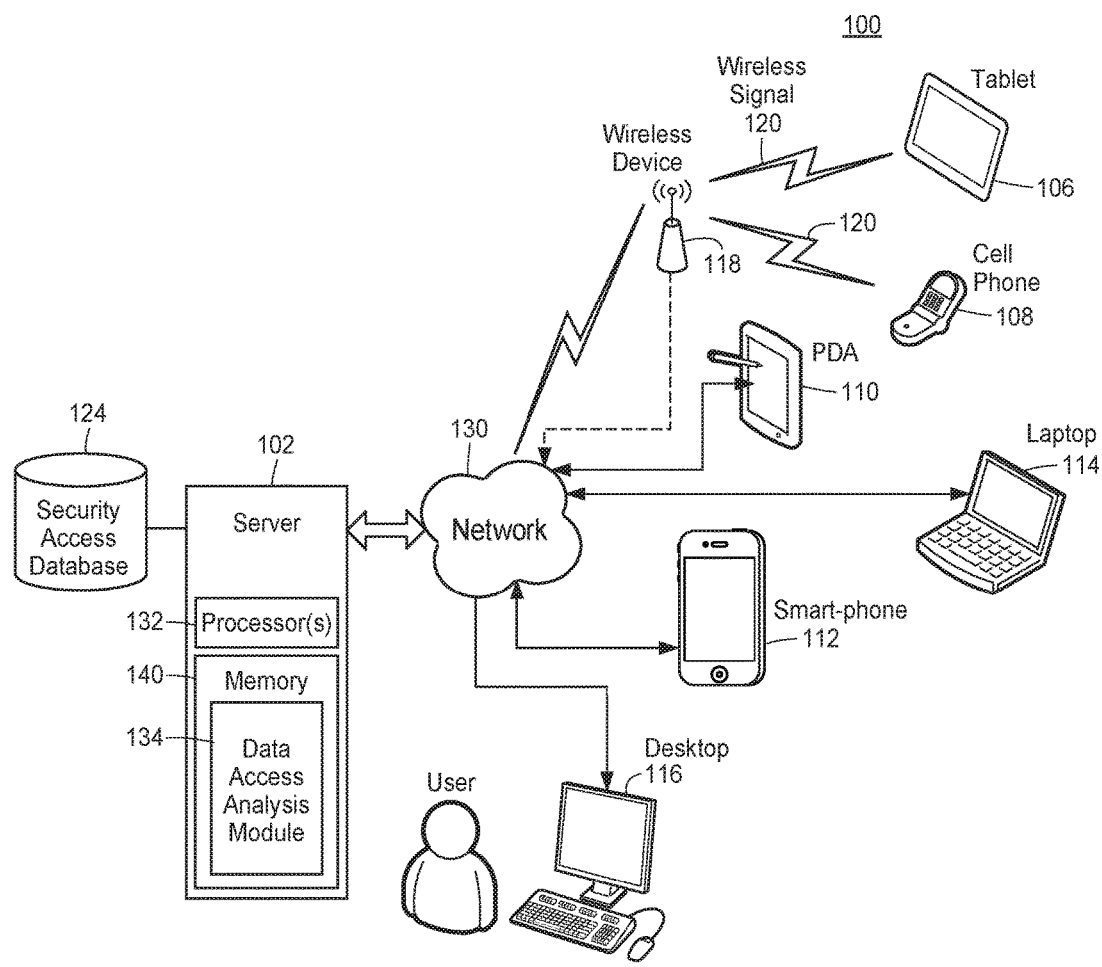
FIG. 1 illustrates a block diagram of a computer network and system on which an exemplary data access display system may operate in accordance with an exemplary aspect of the present disclosure.

The figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

To identify users having unauthorized access to secure data assets within an organization, a data access analysis module may identify each of the users in the organization, for example, by their respective user accounts. In some embodiments, the data access analysis module may obtain each user account from a security access database. The data access analysis module may also identify connections between users when a pair of users are assigned to the same security group. For example, user A and user B may both be assigned to the marketing security group because they are both within the marketing department. Each user and each connection between users may be displayed in a graph data structure where users are represented as nodes and connections are represented as edges.

In some embodiments, a group of the nodes may be organized in a cluster when several nodes in the group are connected to several other nodes within the group. For example, if thirty users (represented as nodes) are all within the marketing security group, then the thirty corresponding nodes may be clustered together in the display. A system administrator and/or security analyst may view the graph and identify users who are connected to disparate security groups. Such users may be likely to have unauthorized access to certain secure data assets, and as a result the system administrator and/or security analyst may resolve the unauthorized access, for example, by removing the user from one of the disparate security groups.

By displaying the users and their respective connections using various virtual representation, depiction, and/or graphing techniques, a very complex security structure involving hundreds or even thousands of paths in which a user may access a secure data asset (e.g., via several nested security groups), may be transformed so that the system administrator and/or security analyst may be immediately directed to users who are likely to have unauthorized access using the simple, easy to read display. Moreover, by automatically determining users who are likely to have unauthorized access to secure data assets, the present embodiments advantageously allow for quick and accurate data cleanup procedures.

Generally speaking, the techniques for identifying users who have unauthorized access to secure data assets may be implemented in one or more network servers, in one or more client devices, or a system that includes several of these devices. However, for clarity, the examples below focus primarily on an embodiment in which a server device may generate user interfaces including graphs which display representations of users and their connections to other users. The server device may transmit the user interfaces to a client device which may be viewed by a system administrator and/or a security analyst. In other embodiments, the user interfaces may be displayed on the server device and viewed by the system administrator and/or security analyst.

I. Exemplary Environment for Data Access Display

FIG. 1 illustrates various aspects of an exemplary environment implementing a data access display system 100. The environment 100 may include a server device 102, and/or a plurality of client devices 106-116 which may be communicatively connected through a network 130, as described below. According to embodiments, the server device 102 may be a combination of hardware and software components, also as described in more detail below. The server device 102 may have an associated database 124 for storing data related to the operation of the data access display system 100 (e.g., user accounts for each user, job functions for each user, security groups as well as their associated permissions and user accounts, secure data assets, etc.). Moreover, the server device 102 may include one or more processor(s) 132 such as a microprocessor coupled to a memory 140.

The memory 140 may be tangible, non-transitory memory and may include any types of suitable memory modules, including random access memory (RAM), read-only memory (ROM), flash memory, other types of persistent memory, etc. The memory 140 may store, for example instructions executable on the processors 132 for a data access analysis module 134. The server device 102 is described in more detail below with reference to FIG. 2A.

A. Exemplary Data Access Analysis Module

To identify users likely to have unauthorized access to secure data assets, the data access analysis module 134 may identify several users and their respective job functions and/or security groups, for example, from the security access database 124. The data access analysis module 134 may then transform the user data, job function data and/or security group data from the security access database 124 to graph data structure elements (e.g., nodes, edges, etc.) to generate a graph data structure with nodes of the graph representing users and edges representing connections between pairs of users who are within the same security group. The graph data structure may be displayed on a computing or mobile device, such as the client devices 106-116 and/or the server device 102 for the system administrator and/or security analyst to view and/or analyze.

In some embodiments, the data access analysis module 134 may generate additional features along with the graph data structure. For example, a group of nodes may appear clustered together when several nodes are connected to several other nodes within the cluster, so that the system administrator and/or security analyst may clearly see that many of the nodes in the group belong to the same security group.

Moreover, a betweenness centrality (also referred to herein as "betweenness") may be calculated for each node, and may be indicative of a number of indirect connections that the node is partially responsible for creating. For example, if node A is not directly connected to node B by an edge, but node A is connected to node C and node C is connected to node B, then node C is at least partially responsible for creating the connection between node A and node B, thereby increasing node C's betweenness. The betweenness for each node may be displayed on the computing device. In other embodiments, a node having a high betweenness may increase in size and appear larger on the computing device than nodes having low betweenness.

B. Exemplary Client Devices

The client devices 106-116 may include, by way of example, various types of "mobile devices," such as a tablet computer 106, a cell phone 108, a personal digital assistant (PDA) 110, a smart-phone 112, a laptop computer 114, a desktop computer 116, a portable media player (not shown), a home phone, a pager, a wearable computing device, smart glasses, smart watches or bracelets, phablets, other smart devices, devices configured for wired or wireless RF (Radio Frequency) communication, etc. Of course, any client device appropriately configured may interact with the data access display system 100. The client devices 106-116 need not necessarily communicate with the network 130 via a wired connection. In some instances, the client devices 106-116 may communicate with the network 130 via wireless signals 120 and, in some instances, may communicate with the network 130 via an intervening wireless or wired device 118, which may be a wireless router, a wireless repeater, a base transceiver station of a mobile telephony provider, etc. The client devices 106-116 may include devices which are used by members of an organization to access an organizational communication network, such as a local area network (LAN), a virtual private network (VPN), etc.

The client devices 106-116 may access the network via user accounts and may access secure data assets shared within the network based upon permissions associated with security groups corresponding to the user accounts. Moreover, the client devices 106-116 may also include devices which may be used to set and/or change permissions for security groups to access secure data assets, and to place and/or remove user accounts from security groups. For example, the client devices 106-116 may include a client device used by a system administrator and/or security analyst.

Each of the client devices 106-116 may interact with the server device 102 to receive web pages and/or server data and may display the web pages and/or server data via a client application and/or an Internet browser (described below). For example, the laptop computer 114 may display a graph data structure representing users and shared security groups, and may interact with the server device 102 depending on the type of input. For example, the system administrator and/or security analyst may select user controls to zoom in on a particular region of the graph data structure and/or to receive attributes of a particular user such as betweenness, the user's connections, etc.

It will be appreciated that although only one server device 102 is depicted in FIG. 1, multiple servers 102 may be provided for the purpose of distributing server load, serving different web pages, etc. These multiple servers 102 may include a web server, an entity-specific server (e.g. an Apple® server, etc.), a server that is disposed in a retail or proprietary network, etc.

The server device 102 may communicate with the client devices 106-116 via the network 130. The digital network 130 may be a proprietary network, a secure public Internet, a local area network (LAN), a wide area network (WAN), a virtual private network (VPN) or some other type of network, such as dedicated access lines, plain ordinary telephone lines, satellite links, combinations of these, etc. Where the digital network 130 comprises the Internet, data communication may take place over the digital network 130 via an Internet communication protocol. In some embodiments, the digital network 130 may be a password protected organizational network where only members of the organization having user accounts may access the network.

II. Exemplary System Hardware

A. Exemplary Server Device

Figure 2A:
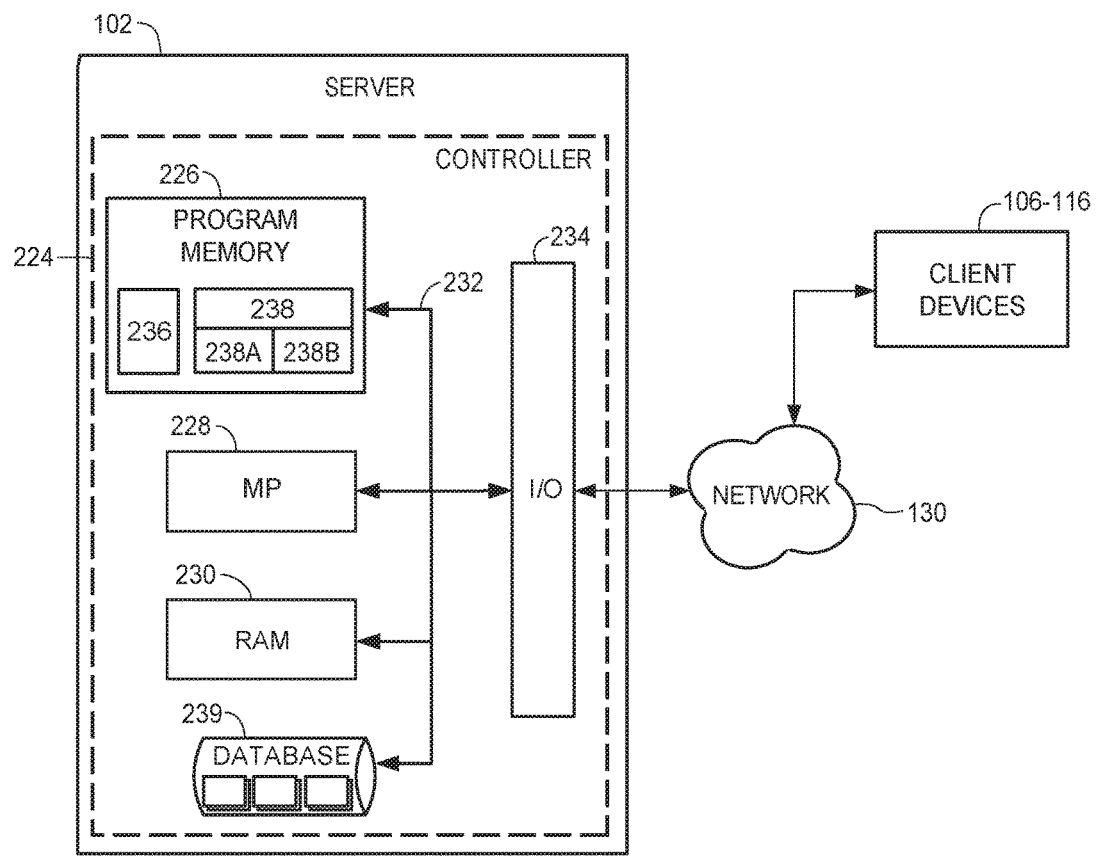
FIG. 2A illustrates a block diagram of an exemplary server device in accordance with an exemplary aspect of the present disclosure.

Turning now to FIG. 2A, the server device 102, may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. The program memory 226 and the microprocessor 228 may be similar to the memory 140 and processor 132 respectively, as described in FIG. 1. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as user accounts, secure data assets, security groups, permissions for security groups to access secure data assets, web page templates and/or web pages, and other data necessary to interact with users, security administrators, and/or security analysts through the network 130. It should be appreciated that although FIG. 2A depicts only one microprocessor 228, the controller 224 may include multiple microprocessors 228. Similarly, the memory of the controller 224 may include multiple RAMs 230 and/or multiple program memories 226. Although FIG. 2A depicts the I/O circuit 234 as a single block, the I/O circuit 234 may include a number of different types of I/O circuits. The controller 224 may implement the RAM(s) 230 and/or the program memories 226 as semiconductor memories, magnetically readable memories, and/or optically readable memories, for example.

As shown in FIG. 2A, the program memory 226 and/or the RAM 230 may store various applications for execution by the microprocessor 228. For example, a user-interface application 236 may provide a user interface to the server device 102, which user interface may, for example, allow the system administrator and/or security analyst to configure, troubleshoot, or test various aspects of the server's operation including identifying users with unauthorized access to secure data assets based upon the graph data structure displays. A server application 238 may operate to transform user and/or security group data from the database 239 to generate and/or transmit graph data structure displays to the client device 106-116 and/or to the user-interface application 236 for the system administrator and/or security analyst to view and/or analyze. The server application 238 may be a single module 238 such as the data access analysis module 134 of FIG. 1 or a plurality of modules 238A, 238B.

While the server application 238 is depicted in FIG. 2A as including two modules, 238A and 238B, the server application 238 may include any number of modules accomplishing tasks related to implantation of the server device 102.

B. Exemplary Computing Device

Figure 2B:
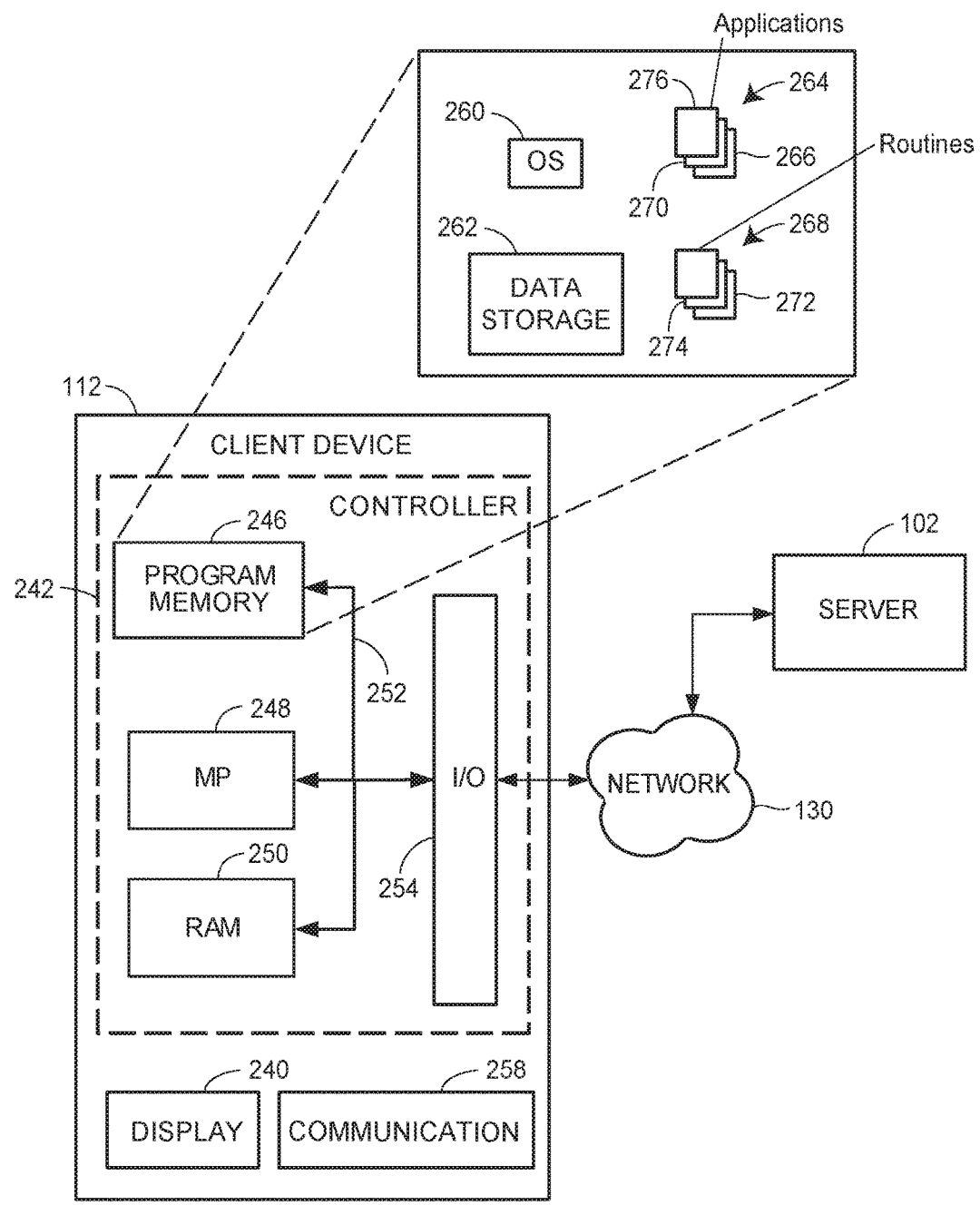
FIG. 2B illustrates a block diagram of an exemplary client device in accordance with an exemplary aspect of the present disclosure.

Referring now to FIG. 2B, the laptop computer 114 (or any of the client devices 106-116) may include a display 240, a communication unit 258, a user-input device (not shown), and, like the server 102, a controller 242. Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include Microsoft Windows®, OS X®, Linux®, Unix®, etc. The data storage 262 may include data such as user profiles, application data for the plurality of applications 264, routine data for the plurality of routines 268, and/or other data necessary to interact with the server 102 through the digital network 130. In some embodiments, the controller 242 may also include, or otherwise be communicatively connected to, other data storage mechanisms (e.g., one or more hard disk drives, optical storage drives, solid state storage devices, etc.) that reside within the laptop computer 114.

The communication unit 258 may communicate with the server 102 via any suitable wireless communication protocol network, such as a wireless telephony network (e.g., GSM, CDMA, LTE, etc.), a Wi-Fi network (802.11 standards), a WiMAX network, a Bluetooth network, etc. The user-input device (not shown) may include a "soft" keyboard that is displayed on the display 240 of the laptop computer 114, an external hardware keyboard communicating via a wired or a wireless connection (e.g., a Bluetooth keyboard), an external mouse, or any other suitable user-input device.

As discussed with reference to the controller 224, it should be appreciated that although FIG. 2B depicts only one microprocessor 248, the controller 242 may include multiple microprocessors 248. Similarly, the memory of the controller 242 may include multiple RAMs 250 and/or multiple program memories 246. Although the FIG. 2B depicts the I/O circuit 254 as a single block, the I/O circuit 254 may include a number of different types of I/O circuits. The controller 242 may implement the RAM(s) 250 and/or the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the laptop computer 114.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information from the server 102 while also receiving inputs from the user. Another application of the plurality of applications may include an embedded web browser 276 that may be implemented as a series of machine-readable instructions for receiving, interpreting, and/or displaying web page information from the server 102. One of the plurality of routines may include a graph display routine 272 which obtains the graph data structure from the server device 102 and displays the graph data structure on the user interface 240. Another routine in the plurality of routines may include a zoom routine 274 that receives user-input instructing the laptop computer 114 to zoom in or out of the graph data display, and/or displays a zoomed version of the graph data display in response to the user-input.

Preferably, a system administrator and/or security analyst may launch the client application 266 from a client device, such as one of the client devices 106-116, to communicate with the server 102 to implement the data access display system 100. Additionally, the system administrator and/or security analyst may also launch or instantiate any other suitable user interface application (e.g., the native application or web browser 270, or any other one of the plurality of software applications 264) to access the server device 102 to realize the data access display system 100.

III. Exemplary Security Mapping Structure

Figure 3:
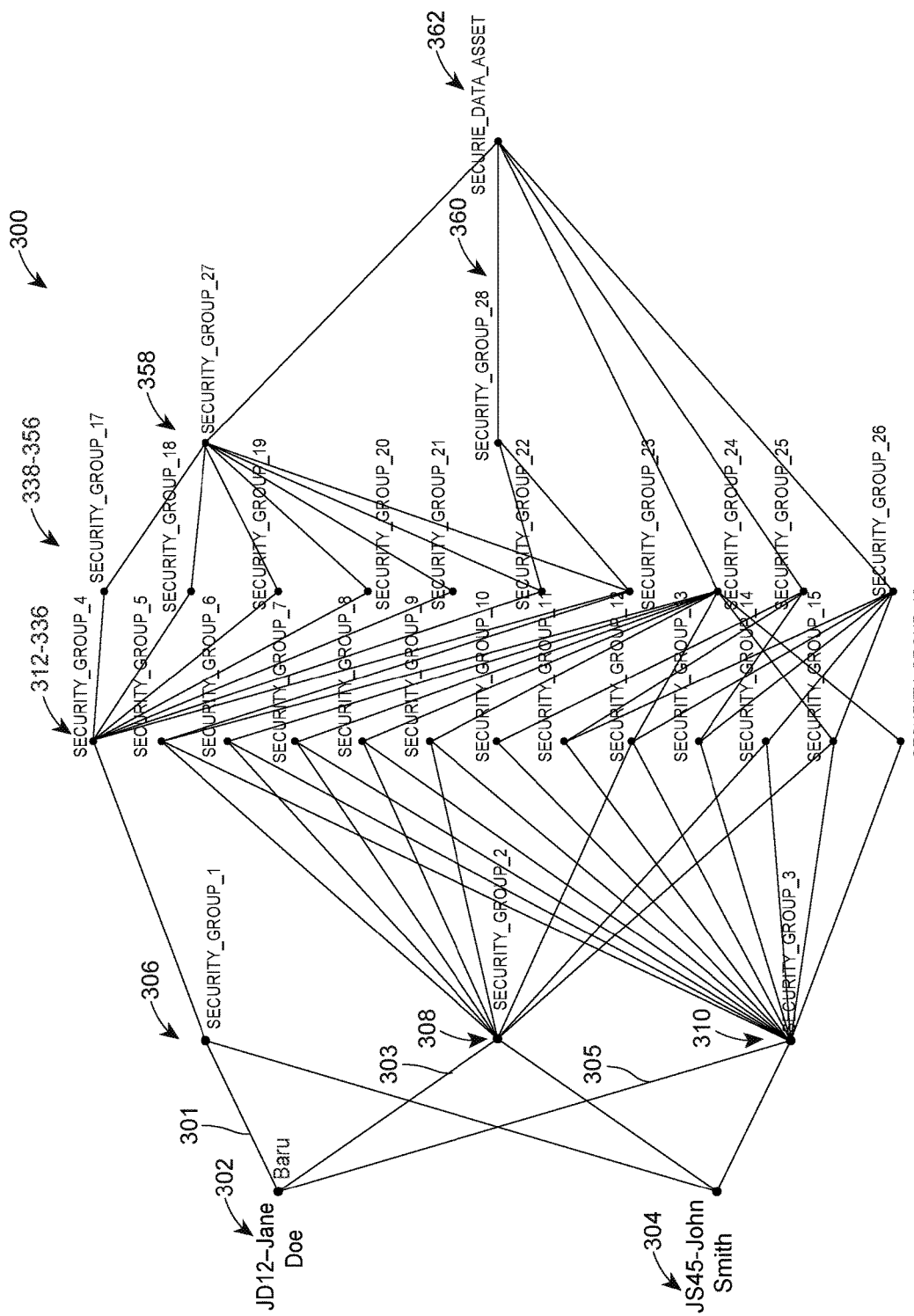
FIG. 3 depicts an exemplary security mapping structure in accordance with an exemplary aspect of the present disclosure.

FIG. 3 depicts an exemplary security mapping structure 300 which may be generated by the server device 102 and displayed by the client application 266 of one of the client devices 106-116, and/or by the user-interface application of the server device 102. As will be appreciated by those of ordinary skill in the relevant art(s), the exemplary display shown in FIG. 3 is for illustrative purposes, and the associated functionality may be implemented using any suitable format and/or design for facilitating corresponding described functionalities without departing from the spirit and scope of the present disclosure.

The security mapping structure 300 includes users 302, 304, security groups 306-360, and a secure data asset 362 which may be retrieved from the security access database 124 of FIG. 1. The users 302, 304, security groups 306-360, and secure data asset 362 are each represented as nodes in the display and, in some embodiments, each node may be labeled according to the node's corresponding user or security group. Connections or edges are displayed to represent users or security groups which belong to a particular security group. For example, Jane Doe 302 belongs to security groups 306-310 as indicated by connections 301, 303, and 305. In turn, security group 306 belongs to security group 312, and as a result, users which belong to security group 306 may have permission to access secure data assets which security group 312 has permission to access.

Connections or edges may also be displayed to represent security groups which have permission to access a secure data asset. For example, security groups 352-360 may have permission to access secure data asset 362 as indicated by their connections. Moreover, each of the users 302 and 304, and each of the rest of the security groups 306-350 may have permission to access secure data asset 362 based upon their respective connections to at least one of security groups 352-360.

In this manner, a system administrator and/or security analyst may view the complexity of the security structure according to the mapping. In particular, the system administrator and/or security analyst may view the various nested security groups and recognize, for example, that security group 310 belongs to security groups 314-336 which in turn belong to several other security groups in a multi-leveled structure. The security mapping structure 300 may allow for the system administrator and/or security analyst to reduce some of the complexity of the security structure based upon the display. Furthermore, as shown in FIG. 3, each user may access a secure data asset via hundreds or thousands of paths based upon the several levels of security groups in which the user belongs making it very difficult for a system administrator and/or security analyst to recognize when a user may have unauthorized access to a secure data asset via any single path.

While the security mapping structure 300 includes two users and one secure data asset, this is merely for ease of illustration only. The security mapping structure 300 may include any suitable number of users, secure data assets and security groups.

IV. Exemplary Graph Data Structure Display

Figure 4:
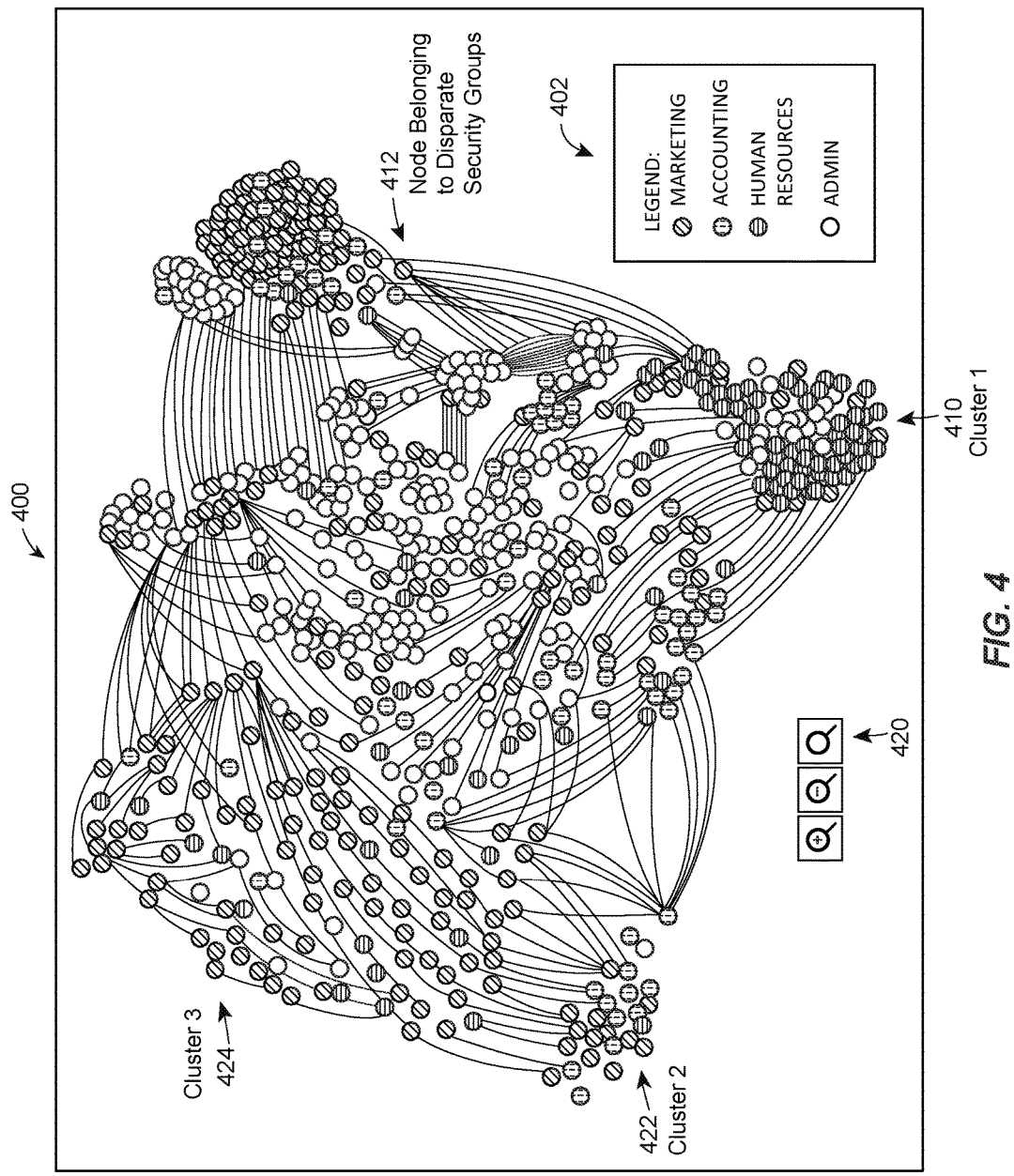
FIG. 4 depicts an exemplary graph data structure display in accordance with an exemplary aspect of the present disclosure.

FIG. 4 depicts an exemplary graph data structure display 400 which may be generated by the server device 102 and displayed by the client application 266 of one of the client devices 106-116, and/or by the user-interface application of the server device 102. As will be appreciated by those of ordinary skill in the relevant art(s), the exemplary display shown in FIG. 4 is for illustrative purposes, and the associated functionality may be implemented using any suitable format and/or design for facilitating corresponding described functionalities without departing from the spirit and scope of the present disclosure.

The graph data structure display 400 includes users, job functions for each user, and/or security groups to which the users belong. The server device 102, and in some embodiments the data access analysis module 134, may obtain the indications of users, job functions for each user, and/or security groups to which the users belong from the security access database 124. The user data, job function data and/or security group data may be transformed to a visual representation or graphical depiction, such as the graph data structure display 400 and/or the anomaly detection display 500 as described in more detail below (e.g., the user data, job function data and/or security group data may be transformed to graph data structure elements, such as nodes and/or edges). In this manner, a complex security structure, such as the exemplary security mapping structure 300 as shown in FIG. 3, may be represented visually for fast and/or efficient identification of users who are potentially and/or likely to have unauthorized access to secure data assets.

Users are represented as nodes, which may include labels identifying the users and/or indicators such as a color, pattern, number, etc., on the nodes to identify the job function for each user. In some embodiments, the indicators may also identify security groups to which the users belong, and/or secure data assets which the users have permission to access. The graph data structure display 400 may also include a legend 402 which describes the job function, security group, secure data asset, etc., corresponding to each indicator. For example, the legend 402 describes a red color indicates that the user is in marketing, a green color indicates the user is in accounting, a yellow color indicates the user is in human resources and a blue color indicates the user is in office administration.

A user may be connected to another user via an edge of the graph data structure when both users belong to the same security group. In some embodiments, a user belongs to a security group in which she is a listed member, as well as a (different, larger, or overlapping) security group which includes a security group in which the user is a listed member. For example, in FIG. 3, Jane Doe 302 is a listed member of security group 306 which belongs to security group 312. In some embodiments, Jane Doe 302 belongs to security group 306 and security group 312.

In any event, if user A and user B both belong to security group ADMIN_G, an edge is displayed between the nodes corresponding to users A and B, respectively. Furthermore, groups of users may be displayed in a cluster when several users in the group are connected to several other users within the group. For example, at the bottom of the display 410 several users, most of which are in human resources, are connected to several other users and displayed in a cluster. This may be because many of the users represented by nodes at the bottom of the display 410 belong to the same security group related to human resources.

Moreover, while some nodes mainly connect to the rest of the nodes within a cluster, other nodes such as node 412 connect to nodes in other clusters which correspond to a different job function and appear far away on the graph data structure display 400. This may indicate that node 412 for example, belongs to two disparate security groups and the corresponding user may be likely to have unauthorized data access based upon his association with one of the security groups. The system administrator and/or security analyst may identify that the user belongs to two disparate security groups based upon the display and remove the user from one of the security groups and/or take some other suitable action to ensure the user does not have unauthorized data access.

For example, the system administrator and/or security analyst may determine that the user should belong to both disparate security groups and may not remove the user from either security group. On the other hand, the system administrator and/or security analyst may determine that the user should not belong to one of the disparate security groups and consequently may remove the user from one of the groups, or that the user should not belong to either security group (e.g., the user has been terminated from her employment with the organization) and remove her from both groups. In some scenarios, in the case of a nested security group, the user may be removed from all security groups which belong to a security group to which the user should not belong.

To further assist the system administrator and/or security analyst in making this determination, the graph data structure display 400 may include one or several user controls 420 for zooming in, zooming out, and/or panning the graph data structure display 400. In this manner, the system administrator and/or security analyst may examine a particular node or region of nodes in more detail. Moreover, in some embodiments, the data access analysis module 134 may determine attributes of each node based upon the graph data structure display 400 such as the betweenness of a node.

As mentioned above, betweenness for a particular node may be indicative of a number of indirect connections between a pair of nodes that the particular node is at least partially responsible for creating. Betweenness may be calculated by determining the shortest paths between every pair of nodes in the graph data structure display 400. For example, if the graph contains five nodes, A-E, the data access analysis module 134 may calculate the shortest path between A-B, A-C, A-D, A-E, B-C, B-D, B-E, C-D, C-E, and D-E. The shortest path for nodes A-B may be the least amount of connected nodes which node A must pass through to reach node B. For example, if node A is directly connected to node B by an edge of the graph then the shortest path is A to B. On the other hand, if A is not directly connected to node B by an edge, but A is connected to C and C is connected to B, then the shortest path may be A to C to B.

The betweenness for node B, for example, may be calculated by determining for every pair of nodes not including node B, the likelihood that node B is on the shortest path between each pair of nodes. For example, for nodes A-C, if there is no direct connection between node A and node C, node B may be on the shortest path of node A to node B to node C. There may also be a second shortest path of node A to node D to node C which does not include node B. Therefore, in this example, the likelihood that node B is on the shortest path between nodes A and C is ½. The likelihoods may then be aggregated for every pair of nodes not including node B in the graph data structure. For example, for the five nodes, A-E, the likelihoods may be aggregated for A-C, A-D, A-E, C-D, C-E, and D-E.

In some embodiments, the betweenness may be normalized to a scale from zero to one by dividing the aggregated betweenness by the number of pairs of nodes not including node B. This may be calculated as $(N-1)(N-2)/2$, where N is the total number of nodes or in the example above, five. In other embodiments, the betweenness may be scaled in any other suitable manner.

In any event, the betweenness for a node may be calculated by the data access analysis module 134 and may be represented on the graph data structure display 400. In some embodiments, the betweenness may be represented by increasing the size of a node based upon the node's betweenness. For example, nodes having a betweenness of between 0.5 and 0.75 may be doubled in size relative to the other nodes, and nodes having a betweenness of above 0.75 may be tripled in size. However, this is merely an example and the size of nodes may increase in any suitable manner based upon their respective betweenness.

In other embodiments, the betweenness may be represented by displaying the betweenness for a node as a number (e.g., from zero to one), a word, a category from a set of categories such as, "High," "Low," "Medium," or in any other suitable manner. The betweenness for a node may be displayed on the graph data structure display 400 when the system administrator and/or security analyst taps or clicks on the node, hovers over or zooms in on the node, provides search information for a particular node and/or group of nodes, such as nodes connected by a particular security group, etc.

In addition to betweenness, other attributes of the node and/or group of nodes may be displayed in response to one of the user controls mentioned above. For example, the number of connections may be displayed for a node as well as identification information for nodes connected to the node, an eigenvector centrality for the node, a clustering coefficient for the node, a number of triangles for nodes directly connected to the node, etc.

As mentioned above, a group of nodes may be displayed in a cluster on the graph data structure display 400 based upon the clustering coefficient. The clustering coefficient for a node A may be the likelihood that every node directly connected to node A is connected to every other node directly connected to node A. For example, if every node directly connected to node A is connected to every other node directly connected to node A, then the clustering coefficient may be one. If none of the nodes directly connected to node A are connected to each other, then the clustering coefficient may be zero.

In some embodiments, when the clustering coefficient for a group of nodes directly connected to node A exceeds a predetermined threshold (e.g., 0.7), the group of nodes are displayed in a cluster on the graph data structure display, such as the cluster 410. In other embodiments, a group of nodes may be displayed such that the proximity of every node to every other node in the group may be proportional to the clustering coefficient. For example, the group of nodes 422 in the graph data structure display 400 are very densely packed together and may have a clustering coefficient of 0.9, whereas the group of nodes 424 are spread out across the display 400 and may have a clustering coefficient of 0.5.

V. Exemplary Anomaly Detection Display

Figure 5:
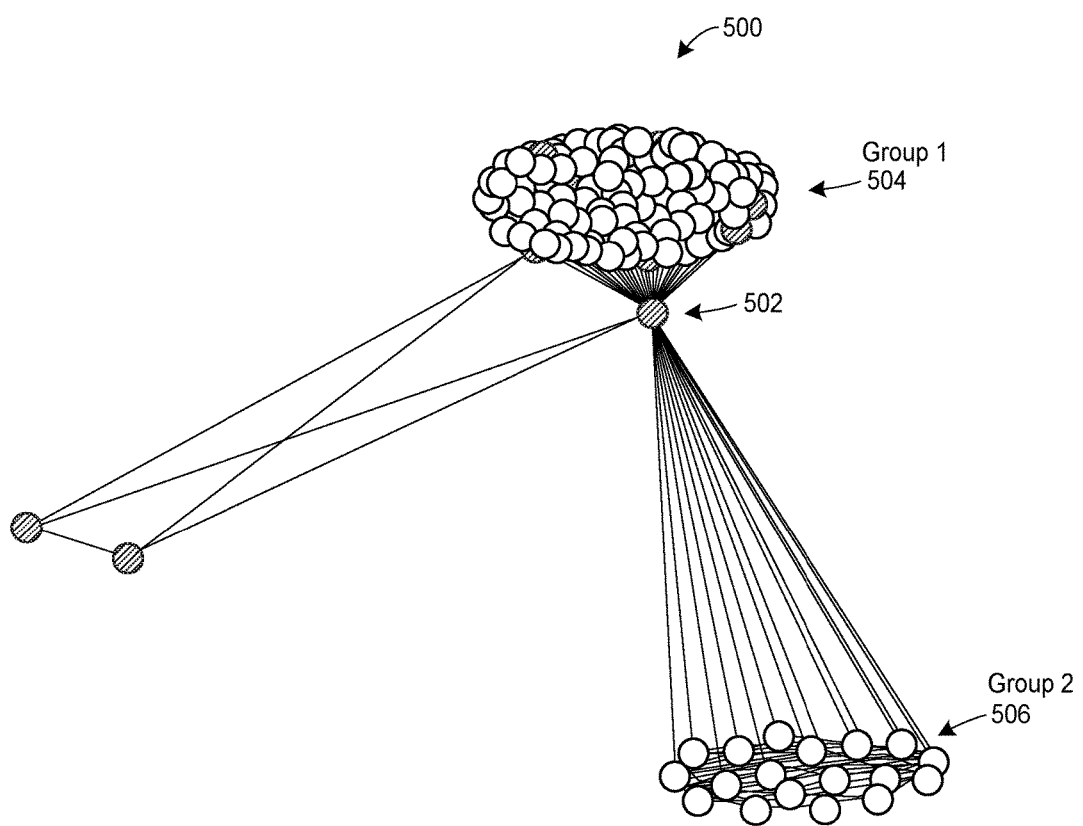
FIG. 5 depicts an exemplary anomaly detection display which highlights a unique combination of security groups for a user in accordance with an exemplary aspect of the present disclosure.

Furthermore, the data access display module 134 may identify nodes corresponding to users who belong to a unique combination of security groups and/or may display the identified nodes with their corresponding connections. For example, the anomaly detection display 500 of FIG. 5 displays a node 502 which may be connected to a first group of nodes 504 at the top of the display 500 and a second group of nodes 506 at the bottom of the display 500. None of the nodes in the first group 504 directly connect to the nodes in the second group 506. As a result, the betweenness for node 502 may be very high because node 502 may be included in all of the shortest paths from each node in group 504 to each node in group 506. As will be appreciated by those of ordinary skill in the relevant art(s), the exemplary display shown in FIG. 5 is for illustrative purposes, and the associated functionality may be implemented using any suitable format and/or design for facilitating corresponding described functionalities without departing from the spirit and scope of the present disclosure.

In some embodiments, the data access display module 134 may provide a notification including an indication of each node which belongs to a unique combination of security groups, so that the system administrator and/or security analyst may determine whether the user corresponding to the node should be removed from one of the security groups.

The data access display module 134 may also rank nodes based upon their respective betweenness, for example, in descending order starting with the node having the highest betweenness. The ranking may then be provided on the anomaly detection display 500 and/or another display for a system administrator and/or security analyst to determine whether any of the highest ranking users need to be removed from one of their corresponding security groups. In other embodiments, the nodes ranking above a predetermined threshold ranking may be labeled on the anomaly detection display 500 and/or the graph data structure display 400 of FIG. 4. Each label may include the respective ranking for the node and/or the node's betweenness.

Moreover, in some embodiments, the data access display module 134 may automatically filter out nodes ranking above a predetermined threshold ranking and/or corresponding to a unique combination of security groups by removing the nodes from one of their corresponding security groups. For example, if the user corresponding to the node is in marketing as indicated by her job function, and she is in two disparate security groups where one group contains a majority of users in marketing and another group contains a majority of users in research and development, the data access display module 134 may automatically remove the user from the security group which contains a majority of users in research and development.

In an exemplary scenario, system administrator James Roe may want to remove users from security groups who have unauthorized access to certain secure data assets. By viewing the security mapping structure 300, the graph data structure display 400, and/or the anomaly detection display 500 of the data access system 100, James Roe may identify three nodes which correspond to users who are likely to have unauthorized access to secure data. The three nodes may each have a very high betweennness, may appear much larger than the other nodes on the displays, may belong to a unique combination of security groups, etc.

After looking up the user accounts for the users corresponding to the three nodes, James may find out that the first user switched job functions within the company and no longer needs access to the security groups related to her old job function. James Roe may also discover that the second user was terminated from the company last year, and the third user requested additional permission to access certain data for a particular project which has since been completed. As a result, Roe may remove each of the users from the security groups to which they should not belong, thereby preventing the users from having unauthorized access to secure data. In this manner, the data access display system 100 allows for a fast, efficient data cleanup procedure.

VI. Exemplary Flow Diagram for Data Access Display

Figure 6:
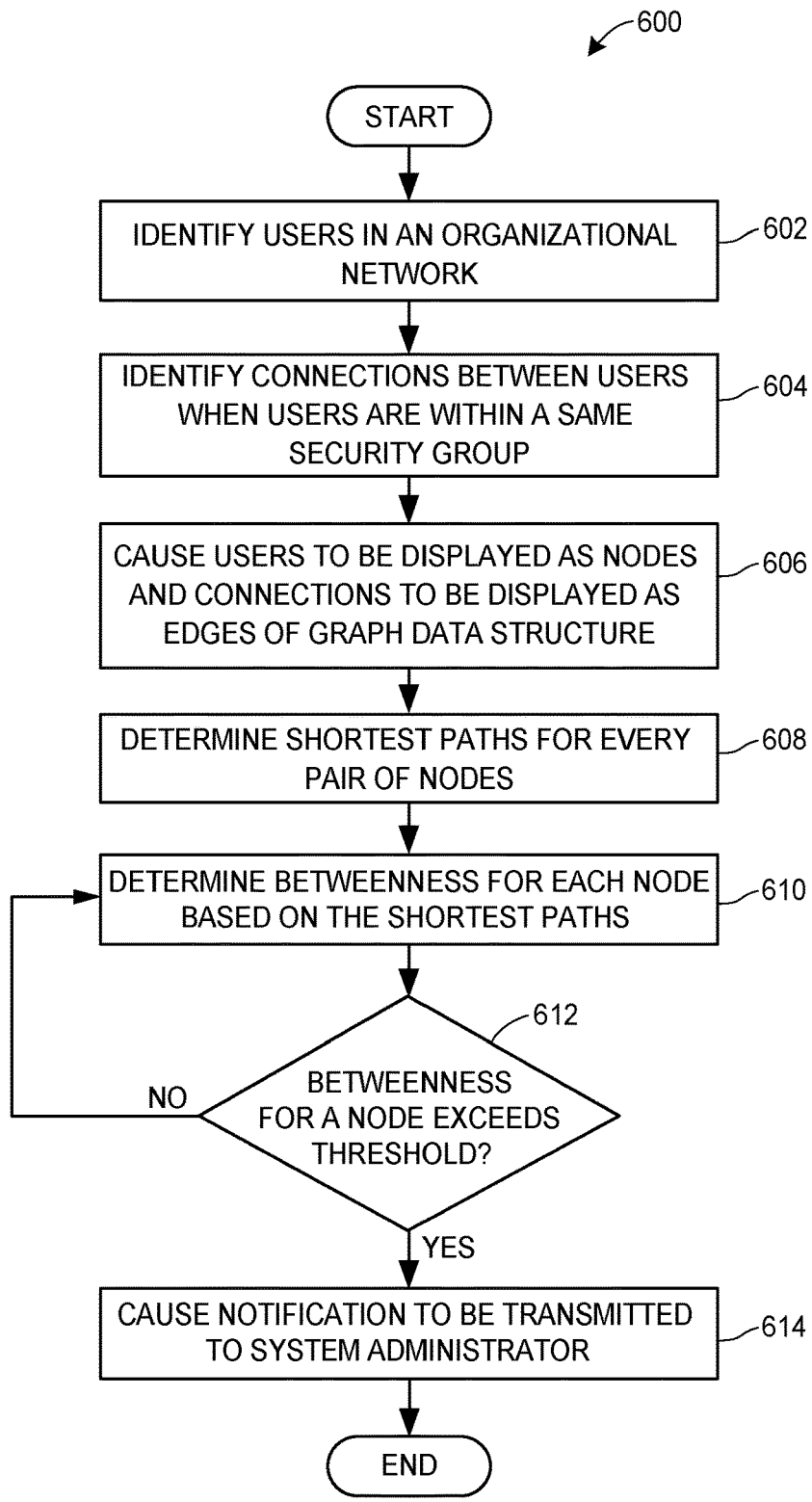
FIG. 6 depicts a flow diagram representing an exemplary server-side method for implementing the data access display system in accordance with an exemplary aspect of the present disclosure.

FIG. 6 depicts a flow diagram representing an exemplary method 600 for identifying users who have unauthorized access to secure data assets. The method 600 may be executed on the server device 102. In some embodiments, the method 600 may be implemented in a set of instructions stored on a non-transitory computer-readable memory and executable on one or more processors of the server device 102. For example, the method 600 may be performed by the data access display module 134 of FIG. 1.

At block 602, the data access display module 134 may identify users within an organizational network by for example, obtaining indications of the users from the security access database 124. The data access display module 134 may also obtain indications of the security groups that each user belongs to and identify a connection between a pair of users when the pair of users are within the same security group (block 604). For example, the data access display module 134 may obtain all users who belong to security group ADMIN_G and identify connections between each of these users.

The data access display module 134 may then transform the user and/or security group data to graph data structure elements (e.g., nodes, edges, etc.) to generate a graph data structure having nodes representing the users and edges representing connections between the users. The graph data structure may be provided to the user interface application 236 of the server device and/or to the display 240 of one of the client devices (block 606) for the system administrator and/or security analyst to view and/or analyze.

Additionally, the data access display module 134 may determine the shortest path between every pair of nodes in the graph data structure (block 608) and calculate betweenness for every node based upon the shortest paths (block 610). If the betweenness exceeds a predetermined threshold (block 612), a notification may be transmitted to the system administrator and/or the security analyst to remove the node from at least one of the node's corresponding security groups and/or to take some other suitable action (block 614). The notification may be presented on the display as indications of the highest ranking nodes according to betweenness.

In other embodiments, the data access display module 134 may notify the system administrator and/or security analyst by increasing the size of the highest ranking nodes relative to the other nodes in the graph data structure, so that the highest ranking nodes are highlighted. The system administrator and/or security analyst may also be notified based upon a display such as the anomaly detection display 500 of FIG. 5, which includes a node corresponding to a user who belongs to a unique combination of security groups and the corresponding connections for the node.

Furthermore, the data access display module 134 may notify the system administrator and/or security analyst by placing labels on the display which include the respective ranking and/or betweenness for each node which exceeds the predetermined threshold. The method may include additional, fewer, or alternative actions, including those discussed elsewhere herein.

VII. Exemplary Flow Diagram for Generating and Analyzing Displays

Figure 7:
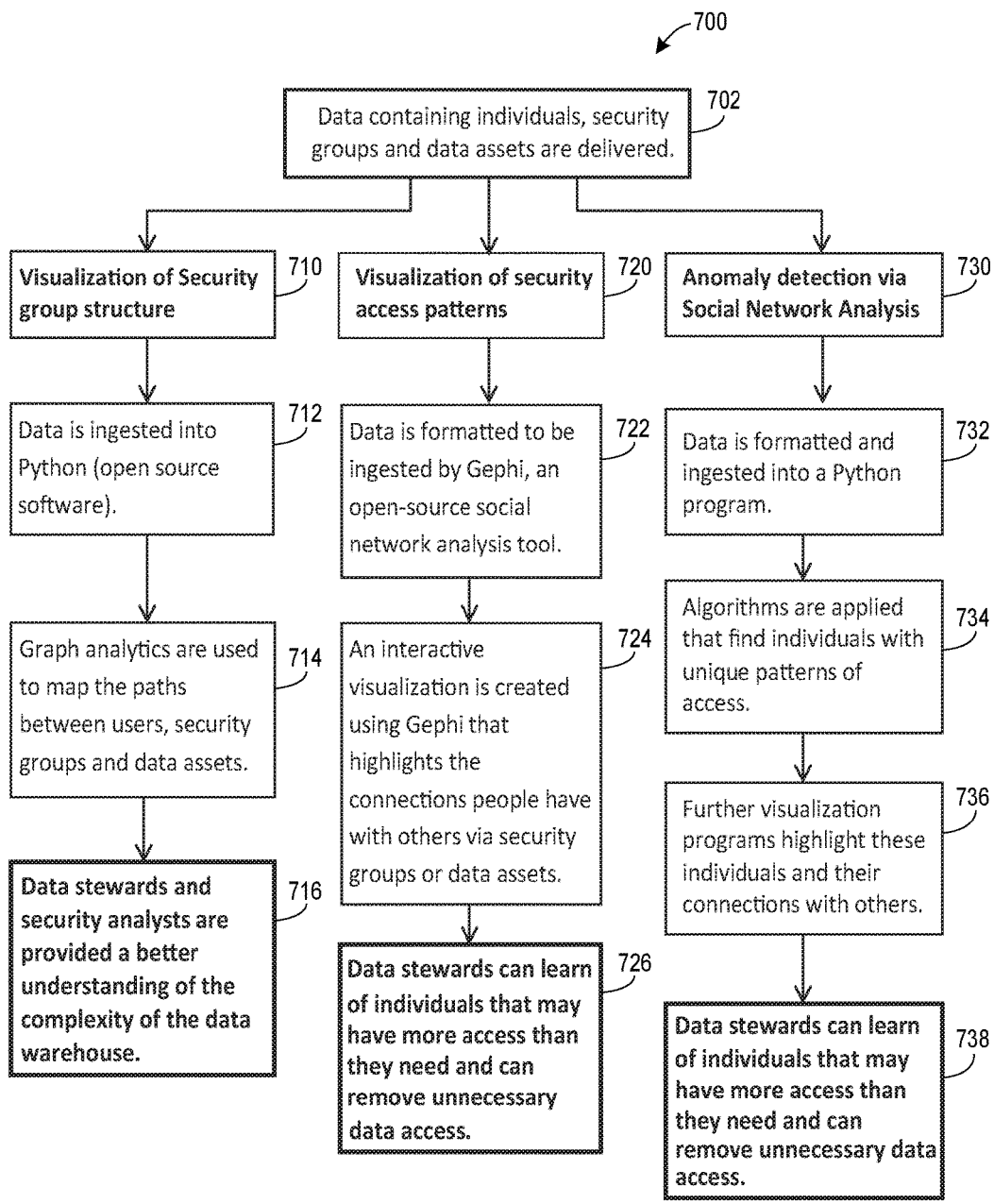
FIG. 7 depicts a flow diagram representing exemplary methods for generating and/or analyzing the various displays such as the displays shown in FIGS. 3-5 in accordance with an exemplary aspect of the present disclosure.

FIG. 7 depicts a flow diagram representing exemplary methods 700 for generating and/or analyzing displays which may represent users, job functions for the respective users, corresponding security groups to which the users belong, and/or secure data assets. The method 700 may be executed on the server device 102. In some embodiments, the method 700 may be implemented in a set of instructions stored on a non-transitory computer-readable memory and executable on one or more processors of the server device 102. For example, the method 700 may be performed by the data access display module 134 of FIG. 1. In some embodiments, the method 700 may generate the security mapping structure 300 of FIG. 3, the graph data structure display 400 of FIG. 4, and/or the anomaly detection display 500 of FIG. 5.

At block 702, the server device 102, and in some embodiments the data access analysis module 134, may obtain data which may contain indications of users, job functions for each user, security groups to which the users belong, and/or secure data assets, for example, from the security access database 124. In some embodiments, the obtained data may be stored in a comma-separated values (CSV) file and/or any other suitable file type.

Based upon the obtained data, the server device 102 may generate visualizations which may include a visualization of a security group structure 710, a visualization of security access patterns (a graph data structure display) 720, and/or a visualization of an anomaly detection 730. Each of these visualizations may be described in more detail above at FIGS. 3-5, respectively, and each method for generating the respective visualizations may be described in more detail below at FIGS. 8-10, respectively. In some embodiments, the visualizations may be generated serially and/or in parallel processes, and the visualizations may be aggregated and/or combined with each other in any suitable manner.

In any event, to generate the security group structure visualization 710, the data obtained at block 702 may be loaded into a software application (e.g. an integrated development environment (IDE) for Python®) which may transform the obtained data into a format for generating a graph display (e.g. a graph file type) (block 712). For example, users, security groups, and/or secure data assets may be represented as nodes of the security group structure visualization 710.

Graph analytics may then be used to map paths between the users, security groups, and/or secure data assets (block 714). For example, when a user belongs to a particular security group, graph analytics may represent the user's membership in the particular security group with an edge such as a line and/or arc between the user and the security group. Referring now to FIG. 3, user Jane Doe's 302 membership in the security group 306 may be represented by the edge 301. Moreover, when a particular security group has permission to access a secure data asset, graph analytics may represent the permission with an edge such as a line and/or arc between the security group and the secure data asset. For example, security group 360 has permission to access secure data asset 362 as represented by the edge.

The security group structure visualization 710 may be displayed on a user interface of a computing device such as the server device 102 and/or the client devices 106-116 for a system administrator and/or security analyst to view (block 716). In this manner, the system administrator and/or security analyst may be provided with an understanding of the complexity of the security structure based upon the mapping. For example, the system administrator and/or security analyst may view the various nested security groups and recognize, for example, that security group 310 belongs to security groups 314-336 which in turn belong to several other security groups in a multi-leveled structure.

To generate the security access patterns visualization (a graph data structure display) 720, the data obtained at block 702 may be transformed into a format for generating a graph display (e.g. a graph file type) and/or may be loaded into a network analysis software application (e.g., Gephi™) (block 722). The security access patterns visualization 720 may be created using the network analysis software application (block 724). For example, users may be represented as nodes of the security access patterns visualization 720, and connections between pairs of users who belong to the same security group may be represented by edges. In some embodiments, the security access patterns visualization 720 may include labels identifying the users and/or indicators such as a color, pattern, number, etc., on the nodes to identify the job function for each user. The indicators may also identify security groups to which the users belong and/or secure data assets which the users have permission to access.

The security access patterns visualization 720 may be displayed on a user interface of a computing device such as the server device 102 and/or the client devices 106-116 for a system administrator and/or security analyst to view (block 726). In this manner, the system administrator and/or security analyst may identify a user who belongs to two disparate security groups based upon the security access patterns visualization 720 and remove the user from one of the security groups and/or take some other suitable action to ensure the user does not have unauthorized data access.

To generate the anomaly detection visualization 730, the data obtained at block 702 may be loaded into a software application (e.g. an IDE for Python®) which may transform the obtained data into a format for generating a graph display (e.g. a graph file type) (block 732). For example, users may be represented as nodes of the anomaly detection visualization 730, and connections between pairs of users who belong to the same security group may be represented by edges.

At block 734, nodes corresponding to users who belong to a unique combination of security groups may be identified and/or may be displayed with their corresponding connections (block 736). For example, the anomaly detection display 500 of FIG. 5 displays node 502 which may be connected to a first group of nodes 504 at the top of the display 500 and a second group of nodes 506 at the bottom of the display 500. None of the nodes in the first group 504 directly connect to the nodes in the second group 506. In some embodiments, to identify users who belong to a unique combination of security groups, the method for generating the anomaly detection visualization 730 may include determining a betweenness for each node as described above and/or ranking the nodes based upon their respective betweenness. The nodes having the highest betweenness and/or their corresponding connections may be displayed in the anomaly detection visualization 730.

The anomaly detection visualization 730 may be displayed on a user interface of a computing device such as the server device 102 and/or the client devices 106-116 for a system administrator and/or security analyst to view (block 738). In this manner, the system administrator and/or security analyst may identify a user who belongs to two disparate security groups based upon the anomaly detection visualization 730 and remove the user from one of the security groups and/or take some other suitable action to ensure the user does not have unauthorized data access. The methods may include additional, fewer, or alternative actions, including those discussed elsewhere herein.

VIII. Exemplary Security Group Visualization Tool

A. Exemplary Flow Diagram for Generating Security Mapping Structure

Figure 8A:
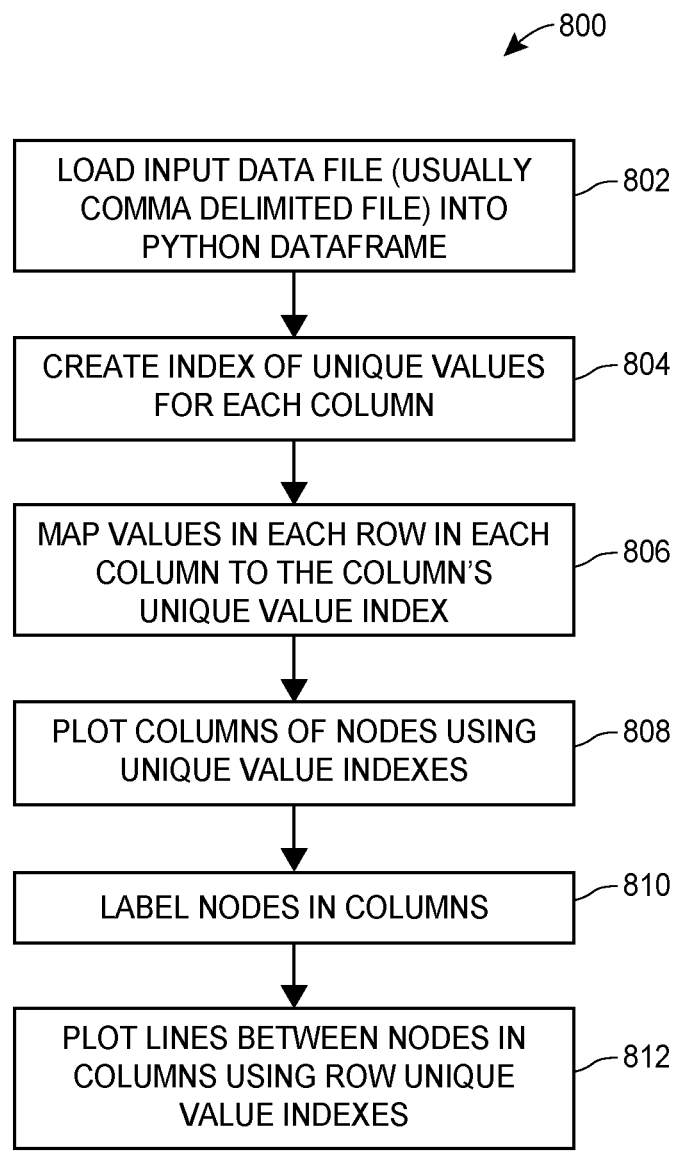
FIG. 8A depicts a flow diagram representing an exemplary method for generating a security mapping structure such as the security mapping structure shown in FIG. 3 in accordance with an exemplary aspect of the present disclosure.
Figure 8B:
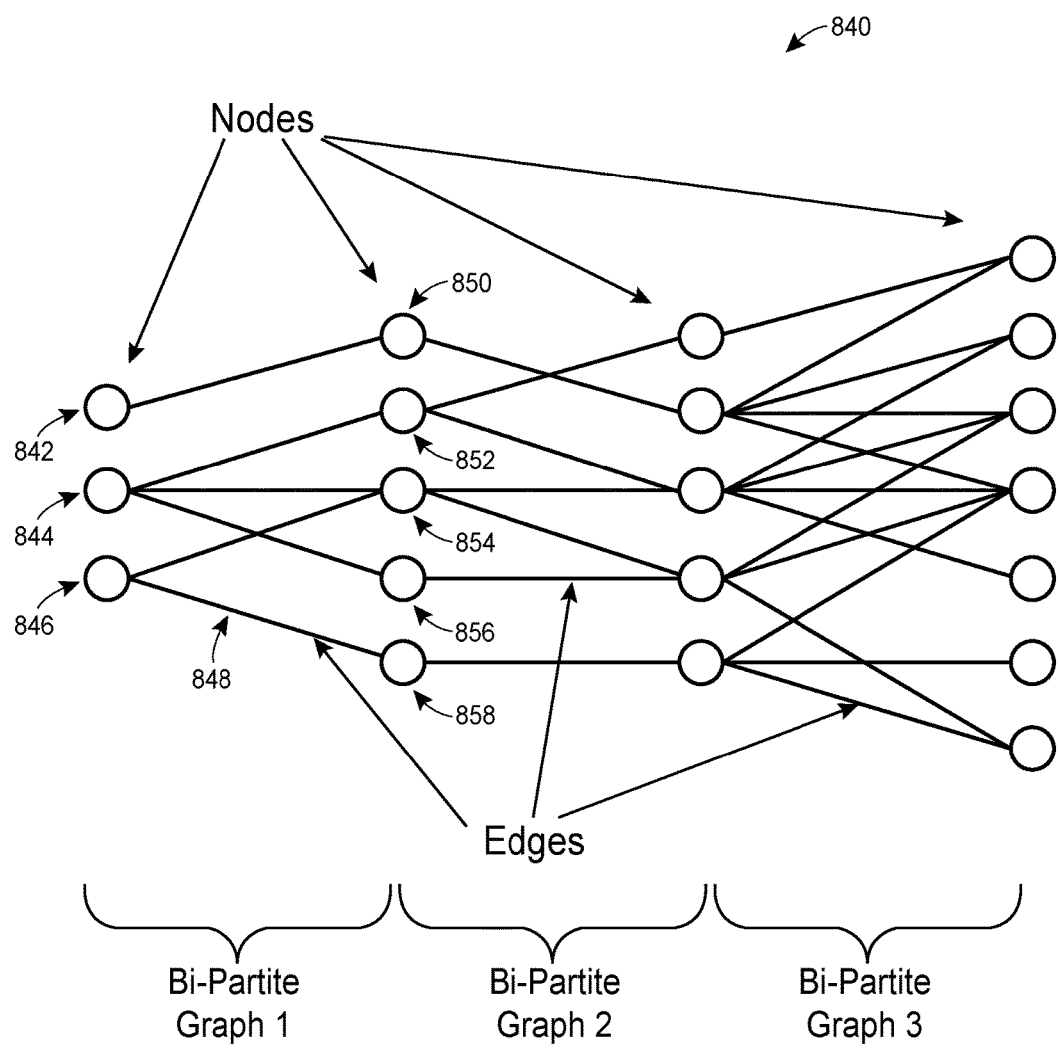
FIG. 8B depicts an exemplary bi-partite graph structure which may be generated by the exemplary method shown in FIG. 8A in accordance with an exemplary aspect of the present disclosure.
Figure 8C:
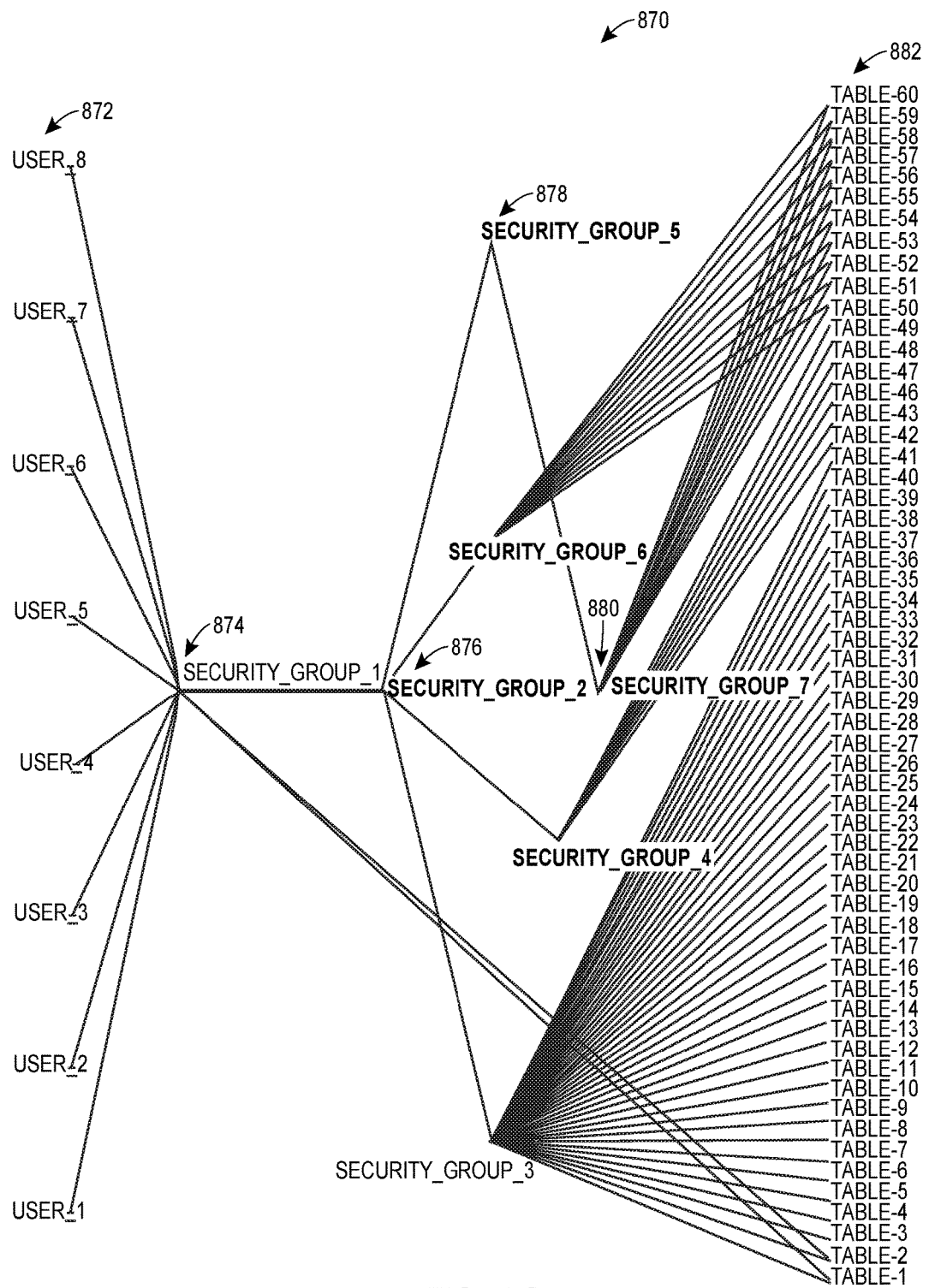
FIG. 8C depicts an exemplary security group visualization which may be generated by the exemplary method shown in FIG. 8A in accordance with an exemplary aspect of the present disclosure.

FIG. 8A depicts a flow diagram representing an exemplary method 800 for generating a security mapping structure such as the security mapping structure 300 of FIG. 3 and/or the security group visualization 870 of FIG. 8C. The method 800 may be executed on the server device 102. In some embodiments, the method 800 may be implemented in a set of instructions stored on a non-transitory computer-readable memory and executable on one or more processors of the server device 102. For example, the method 800 may be performed by the data access display module 134 of FIG. 1.

At block 802, data which may contain indications of users, job functions for each user, security groups to which the users belong, and/or secure data assets, may be loaded into a software application (e.g. an IDE for Python®) which may transform the obtained data into a format for generating a graph display (e.g. a graph file type). In some embodiments, the obtained data may be stored in a CSV file and/or any other suitable file type.

Moreover, the obtained data may be formatted as a series of rows and/or columns where a row may contain a user, one or more security groups, and/or a secure data asset on a security access path from the user to the secure data asset, and each column for the row may contain one of the user, a security group, and/or the secure data asset.

For example, referring to FIG. 3, a row in the obtained data may contain a column which may include an indication of Jane Doe 302, a column which may contain an indication of security group 306, a column which may contain an indication of security group 312, a column which may contain an indication of security group 338, a column which may contain an indication of security group 358, and/or a column which may contain an indication of secure data asset 362. Another row in the obtained data may contain a column which may include an indication of Jane Doe 302, a column which may contain an indication of security group 306, a column which may contain an indication of security group 312, a column which may contain an indication of security group 340, a column which may contain an indication of security group 358, and/or a column which may contain an indication of secure data asset 362.

At block 804, an index of unique values for each column in the obtained data may be created. For example, as described above more than one row which represents a security access path may contain a column which may include an indication of Jane Doe 302. At block 804, the exemplary method 800 may include creating a condensed version of the obtained data which only includes unique values for each column, thereby removing entries which contain duplicate data. For example, the exemplary method 800 may include creating a column which may include users Jane Doe 302 and John Doe 304, a column which may include security groups 306-310, a column which may include security groups 312-336, a column which may include security groups 338-356, a column which may include security groups 358 and 360, and/or a column which may include secure data asset 362.

At block 806, values in each row in the obtained data may be mapped to columns which may include unique values. For example, rows which may contain indications of Jane Doe 302 and John Doe 304, respectively may both be mapped to a column which may contain the unique value for security group 306.

At block 808, users, security groups, and/or secure data assets which may each correspond to a unique value, may be represented as nodes in the security mapping structure such as the security mapping structure 300. Moreover, the nodes may be labeled according to their corresponding values (block 810) such as "Jane Doe," "John Smith," etc.

Security access paths from a user to a secure data asset may be represented by lines and/or arcs between the nodes representing users, security groups, and/or secure data assets (block 812). Lines and/or arcs may be displayed to represent users or security groups which belong to a particular security group. For example, Jane Doe 302 belongs to security groups 306-310 as indicated by connections 301, 303, and 305. In turn, security group 306 belongs to security group 312, and as a result, users which belong to security group 306 may have permission to access secure data assets which security group 312 has permission to access.

Lines and/or arcs may also be displayed to represent security groups which have permission to access a secure data asset. For example, security groups 352-360 may have permission to access secure data asset 362 as indicated by their connections. Moreover, each of the users 302 and 304, and each of the rest of the security groups 306-350 may have permission to access secure data asset 362 based upon their respective connections to at least one of security groups 352-360. The security mapping structure generated by the exemplary method 800 may be described in more detail below with reference to FIGS. 8B-C. The methods may include additional, fewer, or alternative actions, including those discussed elsewhere herein.

B. Exemplary Bi-Partite Graph Structure

FIG. 8B depicts an exemplary bi-partite graph structure 840 which may be generated by the exemplary method 800 of FIG. 8A. A bi-partite graph may be a graph whose nodes may be divided into two sets (e.g., U and V) such that every edge connects a node in set U to a node in set V. For example, nodes 842, 844, and 848 may be included in a first set, U, and nodes 850, 852, 854, 856, and 858 may be included in a second set, V of bi-partite graph 1. Every edge connecting nodes from sets U and V in the bi-partite graph structure 840 may connect a node in set U to a node in set V. None of the nodes in set U are connected to each other by edges, and none of the nodes in set V are connected to each other by edges.

Each of the nodes in the bi-partite graph structure 840 may represent users, security groups, and/or secure data assets. Additionally, each edge between a pair of nodes may represent a permission for the user and/or security group represented by the left node in the pair to access the security group and/or secure data asset represented by the right node in the pair. For example, node 842 may represent a user who belongs to a security group represented by node 846 as indicated by the edge 844.

The columns in the bi-partite graph structure 840 may be generated at block 804 of the exemplary method 800, where unique values are created for each column. In some embodiments, the data represented by the graph data structure may be obtained at block 802 of the exemplary method 800. The obtained data may be formatted as a series of rows and/or columns where a row may contain a user, one or more security groups, and/or a secure data asset on a security access path from the user to the secure data asset, and each column for the row may contain one of the user, a security group, and/or the secure data asset.

Moreover, edges may be generated at block 806 of the exemplary method 800 where values in each row in the obtained data may be mapped to columns which may include unique values. In some embodiments, the leftmost column of nodes of the bi-partite graph structure 840 may represent users, the rightmost column of nodes of the bi-partite graph structure 840 may represent secure data assets, and/or the intermediate columns of nodes may represent security groups. In this manner, the linking across bi-partite graphs such as the bar-partite graphs 1, 2, and 3, may show access patterns from the leftmost nodes representing users, through intermediate nodes representing security groups, to the rightmost nodes representing secure data assets.

C. Exemplary Security Group Visualization

FIG. 8C depicts an exemplary security group visualization 870 which may be generated by the exemplary method 800 of FIG. 8A. The security group visualization 870 may be a bi-partite graph structure similar to the bi-partite graph structure 840 as shown in FIG. 8B, and/or may include labels corresponding to values represented by each node of the bi-partite graph structure. The labels may be generated at block 810 of the exemplary method 800, where nodes in each column may be labeled according to their corresponding values. For example, the nodes in a first column 872 may be labeled as "USER_1" through "USER_8," the node in a second column 874 may be labeled as "SECURITY_GROUP_1," the node in a third column 876 may be labeled as "SECURITY_GROUP_2," the nodes in a fourth column 878 may be labeled as "SECURITY_GROUP_3" through "SECURITY_GROUP_6," the node in a fifth column 880 may be labeled as "SECURITY_GROUP_7," and/or the nodes in a sixth column 882 may be labeled as "TABLE_1" through "TABLE_60."

As described above, edges may be represented by lines and/or arcs to represent security access paths. For example, "USER_1" may have access through "SECURITY_GROUP_1," "SECURITY_GROUP_2," and "SECURITY_GROUP_3" to the secure data asset "TABLE_2." While the secure data assets are labeled as tables in FIG. 8C, this is merely one exemplary type of secure data asset. Secure data assets may also include confidential files, proprietary information, user account information, databases, network drives, files within a network drive, etc. In some embodiments, the security group visualization 870 may be similar to the security mapping structure 300 of FIG. 3.

The security group visualization 870 may be displayed on a user interface of a computing device such as the server device 102 and/or the client devices 106-116 for a system administrator and/or security analyst to view. In this manner, the system administrator and/or security analyst may be provided with an understanding of the complexity of the security structure based upon the mapping. For example, the system administrator and/or security analyst may view the various nested security groups and recognize, for example, that "SECURITY_GROUP_1" belongs to "SECURITY_GROUP_2" which in turn belongs to several other security groups in a multi-leveled structure.

IX. Exemplary Flow Diagram for Generating Graph Data Structure Display

Figure 9:
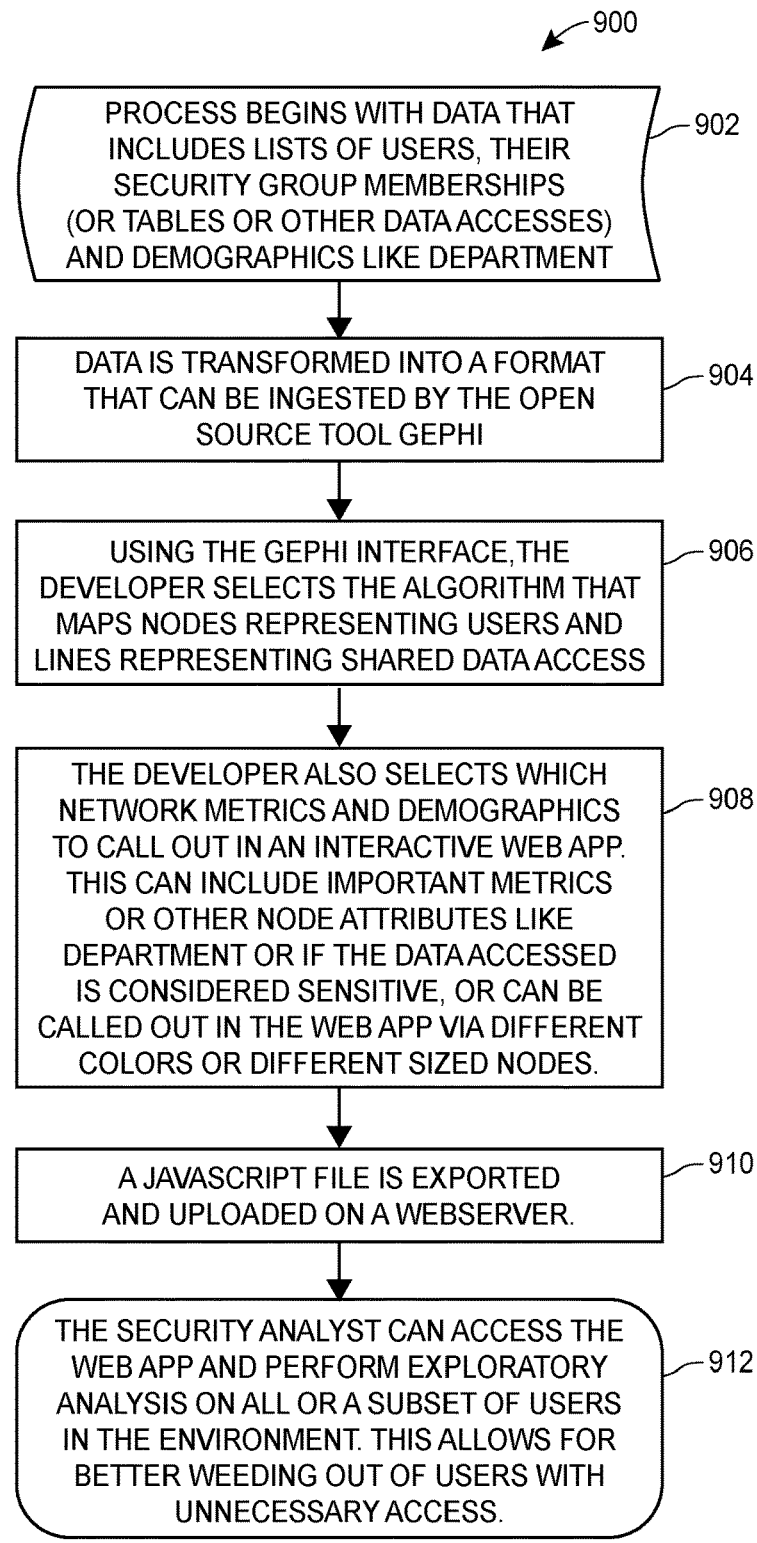
FIG. 9 depicts a flow diagram representing an exemplary method for generating a graph data structure display such as the graph data structure display as shown in FIG. 4 in accordance with an exemplary aspect of the present disclosure.

FIG. 9 depicts a flow diagram representing an exemplary method 900 for generating a graph data structure display such as the graph data structure display 400 of FIG. 4. The method 900 may be executed on the server device 102. In some embodiments, the method 900 may be implemented in a set of instructions stored on a non-transitory computer-readable memory and executable on one or more processors of the server device 102. For example, the method 900 may be performed by the data access display module 134 of FIG. 1.

At block 902, data which may contain indications of users, job functions for each user, security groups to which the users belong, and/or secure data assets, may be obtained, for example, from the security access database 124. In some embodiments, the obtained data may be stored in a CSV file and/or any other suitable file type.

At block 904, the obtained data may be transformed into a format for generating a graph display (e.g. a graph file type) and/or may be loaded into a network analysis software application (e.g., Gephi™).

At block 906, users may be represented as nodes of the graph data structure display such as the graph data structure display 400 of FIG. 4, and connections between pairs of users who belong to the same security group may be represented by edges. In some embodiments, the graph data structure display may include labels identifying the users and/or indicators such as a color, pattern, number, etc., on the nodes to identify the job function for each user. The indicators may also identify security groups to which the users belong and/or secure data assets which the users have permission to access.

At block 908, one or several metrics and/or attributes of the graph data structure may be determined and/or displayed on the graph data structure display. For example, groups of users may be displayed in a cluster when several users in the group are connected to several other users within the group. At the bottom of the display 410 of the graph data structure display 400, several users, most of which are in human resources, are connected to several other users and displayed in a cluster. This may be because many of the users represented by nodes at the bottom of the display 410 belong to the same security group related to human resources.

A clustering coefficient may be calculated for one or several nodes, where the clustering coefficient for a node A may be the likelihood that every node directly connected to node A is connected to every other node directly connected to node A. For example, if every node directly connected to node A is connected to every other node directly connected to node A, then the clustering coefficient may be one. If none of the nodes directly connected to node A are connected to each other, then the clustering coefficient may be zero.

In some embodiments, when the clustering coefficient for a group of nodes directly connected to node A exceeds a predetermined threshold (e.g., 0.7), the group of nodes may be displayed in a cluster on the graph data structure display, such as the cluster 410. In other embodiments, a group of nodes may be displayed such that the proximity of every node to every other node in the group may be proportional to the clustering coefficient. For example, the group of nodes 422 in the graph data structure display 400 are very densely packed together and may have a clustering coefficient of 0.9, whereas the group of nodes 424 are spread out across the display 400 and may have a clustering coefficient of 0.5.

Additionally, a betweenness for one or several nodes may be determined and/or displayed on the graph data structure display. As mentioned above, betweenness for a particular node may be indicative of a number of indirect connections between a pair of nodes that the particular node is at least partially responsible for creating. Betweenness may be calculated by determining the shortest paths between every pair of nodes in the graph data structure display. In some embodiments, the betweenness may be represented by increasing the size of a node based upon the node's betweenness. For example, nodes having a betweenness of between 0.5 and 0.75 may be doubled in size relative to the other nodes, and nodes having a betweenness of above 0.75 may be tripled in size. However, this is merely an example and the size of nodes may increase in any suitable manner based upon their respective betweenness.

In other embodiments, the betweenness may be represented by displaying the betweenness for a node as a number (e.g., from zero to one), a word, a category from a set of categories such as, "High," "Low," "Medium," or in any other suitable manner. The betweenness for a node may be displayed on the graph data structure display when the system administrator and/or security analyst taps or clicks on the node, hovers over or zooms in on the node, provides search information for a particular node and/or group of nodes such as nodes connected by a particular security group, etc.

Moreover, in addition to betweenness other metrics and/or attributes of the graph data structure which may be determined and/or displayed on the graph data structure display may include the number of connections for a node as well as identification information for nodes connected to the node, an eigenvector centrality for the node, a clustering coefficient for the node, a number of triangles for nodes directly connected to the node, etc.

At block 910, the graph data structure display may be displayed on a user interface of a computing device such as the server device 102 and/or the client devices 106-116 for a system administrator and/or security analyst to view. In some embodiments, the server device 102 may include a web server, and the client devices 106-116 may receive web pages from the server device 102. The server device 102 may transmit a web page including the graph data structure display to the client devices 106-116. In some embodiments, the graph data structure display may be generated in a JavaScript file format or any other suitable file format.

The system administrator and/or security analyst may review and analyze the graph data structure display on the user interface of the server device 102 and/or the client device 106-116 (block 912). In this manner, the system administrator and/or security analyst may identify a user who belongs to two disparate security groups based upon the graph data structure display and remove the user from one of the security groups and/or take some other suitable action to ensure the user does not have unauthorized data access. The method may include additional, fewer, or alternative actions, including those discussed elsewhere herein.

X. Exemplary Flow Diagram for Generating Anomaly Detection Display

Figure 10:
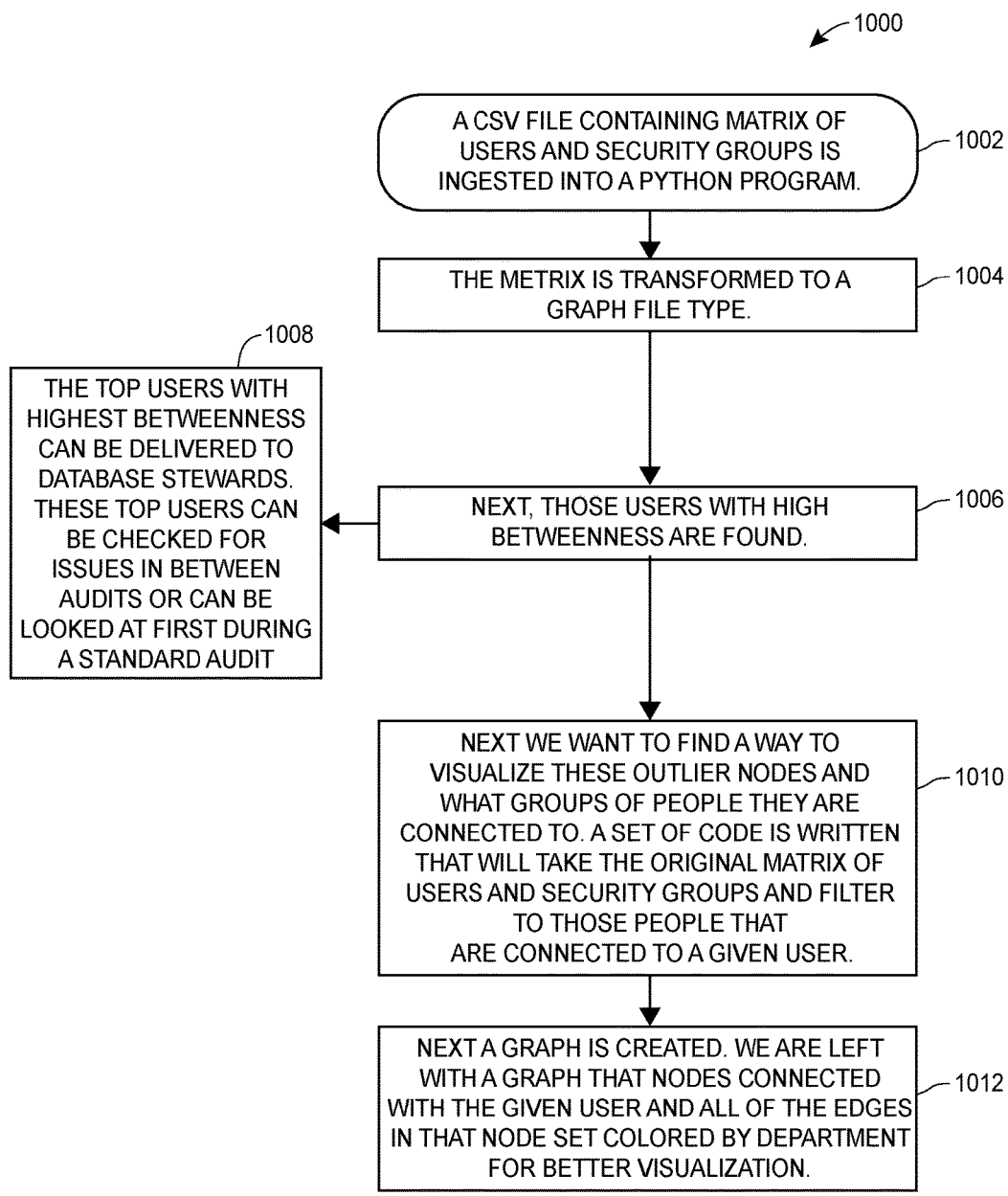
FIG. 10 depicts a flow diagram representing an exemplary method for generating an anomaly detection display such as the anomaly detection display as shown in FIG. 5 in accordance with an exemplary aspect of the present disclosure.

FIG. 10 depicts a flow diagram representing an exemplary method 1000 for generating an anomaly detection display such as the anomaly detection display 500 of FIG. 5. The method 1000 may be executed on the server device 102. In some embodiments, the method 1000 may be implemented in a set of instructions stored on a non-transitory computer-readable memory and executable on one or more processors of the server device 102. For example, the method 1000 may be performed by the data access display module 134 of FIG. 1.

At block 1002, data which may contain indications of users, job functions for each user, security groups to which the users belong, and/or secure data assets, may be loaded into a software application (e.g. an IDE for Python®). In some embodiments, the obtained data may be stored in a CSV file and/or any other suitable file type. At block 1004, the obtained data may be transformed into a format for generating a graph display (e.g. a graph file type) and/or may be loaded into a network analysis software application (e.g., Gephi™).

Users may be represented as nodes of the anomaly detection display such as the graph anomaly detection display 500 of FIG. 5, and connections between pairs of users who belong to the same security group may be represented by edges.

A betweenness for one or several nodes may be determined and nodes may be ranked based upon their respective betweenness, for example, in descending order starting with the node having the highest betweenness (block 1006). The ranking may then be provided on the anomaly detection display and/or another display for a system administrator and/or security analyst to determine whether any of the highest ranking users need to be removed from one of their corresponding security groups (block 1008). In other embodiments, the nodes ranking above a predetermined threshold ranking may be labeled on the anomaly detection display and/or the graph data structure display. Each label may include the respective ranking for the node and/or the node's betweenness.

At block 1010, nodes corresponding to users who belong to a unique combination of security groups may be identified. The identified nodes may be displayed with their corresponding connections (block 1012). In some embodiments, the anomaly detection display may include labels identifying the users and/or indicators such as a color, pattern, number, etc., on the nodes to identify the job function for each user. The indicators may also identify security groups to which the users belong and/or secure data assets which the users have permission to access.

For example, the anomaly detection display 500 of FIG. 5 displays a node 502 which may be connected to a first group of nodes 504 at the top of the display 500 and a second group of nodes 506 at the bottom of the display 500. None of the nodes in the first group directly connect 504 to the nodes in the second group 506. As a result, the betweenness for node 502 may be very high because node 502 may be included in all of the shortest paths from each node in group 504 to each node in group 506.

In some embodiments, the server device 102 and/or the data access display module 134 may provide a notification including an indication of each node which belongs to a unique combination of security groups, so that the system administrator and/or security analyst may determine whether the user corresponding to the node should be removed from one of the security groups. The method may include additional, fewer, or alternative actions, including those discussed elsewhere herein.

XI. Exemplary Method for Data Access Display

In one aspect, a computer-implemented method for identifying users of an information security system who are likely to have unauthorized access to secure data assets may be provided. The method may include: (1) identifying (via one or more processors) a plurality of users, wherein each user has a job function related to a role of the user within an organization and is associated with an organizational network which contains a plurality of secure data assets and a plurality of security groups, each security group having permission to access at least one secure data asset and corresponding to at least one of the plurality of users. For each of the plurality of users the method may include: (2) causing (via the one or more processors, and/or wired or wireless communication and/or data transmission) a node of a graph data structure representing the user to be displayed on a user interface of a computing device; (3) identifying (via the one or more processors) a connection between the node of the user and a node of another user of the plurality of users when the user and the other user both correspond to a same security group of the plurality of security groups; and/or (4) causing (via the one or more processors, and/or wired or wireless communication and/or data transmission) the connection between the corresponding node for the user and the other user to be displayed as an edge of the graph data structure on the user interface to facilitate identification or visualization of users that may have unauthorized access to secure data assets. The method may include determining (via the one or more processors) a clustering coefficient for a subset of the plurality of nodes; and/or causing (via the one or more processors, and/or wired or wireless communication and/or data transmission) the subset of nodes to be displayed on the user interface in a cluster based upon the determined clustering coefficient. The method may also include determining (via the one or more processors) a shortest path between each pair of nodes of the plurality of nodes based upon the connections between the nodes, wherein the shortest path between a pair of nodes is a least number of interconnected nodes in which a first node must pass through to reach a second node; and/or for each of the plurality of nodes the method may include determining (via the one or more processors) a betweenness centrality for the particular node, wherein the betweenness centrality is based upon a number of shortest paths which include the particular node wherein the particular node is not the first node or the second node. The method may include additional, fewer, or alternative actions, including those discussed elsewhere herein.

For instance, the method may include increasing (via the one or more processors) a size of each node in the plurality of nodes based upon the determined betweenness centrality for each node. Moreover, the method may include ranking (via the one or more processors) each of the plurality of users based upon the betweenness centrality for the corresponding respective nodes; and/or providing, by the one or more processors, the ranking of the plurality of users to the computing device.

Furthermore, the method may include removing (via the one or more processors) a user from one or more of the corresponding security groups for the user, when the betweenness centrality for the user is greater than a predetermined threshold. Additionally, the method may include determining (via the one or more processors) a combination of security groups corresponding to a user of the plurality of users which is unique to the user based upon the identified connections between the nodes; and/or causing (via the one or more processors, and/or wired or wireless communication and/or data transmission) the node corresponding to the user having the unique combination of security groups and connections from the node to other nodes within the unique combination of security groups to be displayed on the user interface.

Also, the method may include generating (via the one or more processors) a set of indicators, each indicator identifying a different job function corresponding to the plurality of users; and/or for each of the plurality of nodes, causing (via the one or more processors, and/or wired or wireless communication and/or data transmission) the indicator identifying the job function of the corresponding user to be displayed with the node on the user interface.

The act of determining the betweenness centrality for the particular node may include for each pair of nodes in the plurality of nodes not including the particular node, determining (via the one or more processors) a likelihood that the particular node is included in a shortest path between the pair of nodes; and/or aggregating, by the one or more processors, the likelihoods for each pair of nodes. The act of identifying a plurality of users may include obtaining (via the one or more processors, and/or wired or wireless communication and/or data transmission) at least one of: (i) user data, (ii) job function data, or (iii) security group data from a database, and/or the method may further include transforming (via the one or more processors) at least one of: (i) the user data, (ii) the job function data, or (iii) the security group data to one or more graph data structure elements to generate the graph data structure.

XII. Exemplary System for Data Access Display

In one aspect, a system for identifying users of an information security system who are likely to have unauthorized access to secure data assets may be provided. The system may include one or more processors, and/or a non-transitory computer-readable memory coupled to the one or more processors and storing machine readable instructions, that when executed by the one or more processors, may cause the system to perform various tasks. For example, the instructions may cause the system to: (1) identify a plurality of users, wherein each user has a job function related to a role of the user within an organization and is associated with an organizational network which contains a plurality of secure data assets and a plurality of security groups, each security group having permission to access at least one secure data asset and corresponding to at least one of the plurality of users. For each of the plurality of users, the instructions may cause the system to: (2) cause a node of a graph data structure representing the user to be displayed on a user interface of a computing device; (3) identify a connection between the node of the user and a node of another user of the plurality of users when the user and the other user both correspond to a same security group of the plurality of security groups; and/or (4) cause the connection between the corresponding node for the user and the other user to be displayed as an edge of the graph data structure on the user interface to facilitate identification or visualization of users that may have unauthorized access to secure data assets. The system may include additional, fewer, or alternate components and/or functionality, including that discussed elsewhere herein.

For instance, the instructions may cause the system to determine a clustering coefficient for a subset of the plurality of nodes; and/or cause the subset of nodes to be displayed on the user interface in a cluster based upon the determined clustering coefficient. The instructions may also cause the system to determine a shortest path between each pair of nodes of the plurality of nodes based upon the connections between the nodes, wherein the shortest path between a pair of nodes is a least number of interconnected nodes in which a first node must pass through to reach a second node; and/or for each of the plurality of nodes, the instructions may cause the system to determine a betweenness centrality for the particular node, wherein the betweenness centrality is based upon a number of shortest paths which include the particular node wherein the particular node is not the first node or the second node.

Moreover, the instructions may cause the system to increase a size of each node in the plurality of nodes based upon the determined betweenness centrality for each node. The instructions may also cause the system to rank each of the plurality of users based upon the betweenness centrality for the corresponding respective nodes, and/or provide the ranking of the plurality of users to the computing device. Furthermore, the instructions may cause the system to remove a user from one or more of the corresponding security groups for the user, when the betweenness centrality for the user is greater than a predetermined threshold.

Additionally, the instructions may cause the system to determine a combination of security groups corresponding to a user of the plurality of users which is unique to the user based upon the identified connections between the nodes; and/or cause the node corresponding to the user having the unique combination of security groups and connections from the node to other nodes within the unique combination of security groups to be displayed on the user interface.

Further, the instructions may cause the system to generate a set of indicators, each indicator identifying a different job function corresponding to the plurality of users, and/or for each of the plurality of nodes the instructions may cause the system to cause the indicator identifying the job function of the corresponding user to be displayed with the node on the user interface.

To determine the betweenness centrality for the particular node, the instructions may cause the system to for each pair of nodes in the plurality of nodes not including the particular node, determine a likelihood that the particular node is included in a shortest path between the pair of nodes; and/or aggregate the likelihoods for each pair of nodes. To identify a plurality of users, the instructions may cause the system to obtain at least one of: (i) user data, (ii) job function data, or (iii) security group data from a database, and/or the instructions may further cause the system to: transform at least one of: (i) the user data, (ii) the job function data, or (iii) the security group data to one or more graph data structure elements to generate the graph data structure.

XIII. Additional Considerations

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112, sixth paragraph.

Accordingly, the term "security group," as used herein, may be used to refer to a group of user accounts, computer accounts, and/or other security groups which receive permission to access a certain secure data asset when the security group has permission to access the secure data asset.

As used herein, the term "secure data asset" may be used to refer to computer hardware (e.g., servers and switches), software, and/or confidential information owned by an organization. For example, secure data assets may include confidential files, proprietary information, user account information, databases, network drives, data tables within a database, files within a network drive, etc.

As used herein, the term "graph data structure," or "graph" may be used to refer to a data structure used to model relationships between objects. The graph data structure may include a collection of nodes and edges (ordered or unordered pairs of nodes) which connect the nodes.

The term "node" as used herein may be used to refer to a data point which represents an object. For example, nodes may represent users in an organizational network. A node may be displayed as a dot, a circle, and/or any other suitable indication of a data point.

The term "edge" as used herein may be used to refer to an ordered or unordered pair of nodes that connects nodes which share some common property and/or attribute. For example, two nodes which represent users who belong to the same security group may be connected by an edge in the graph data structure. An edge may be displayed as an arc, a line, and/or any other suitable indication of a connection between nodes.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One may be implement numerous alternate embodiments, using either current technology or technology developed after the filing date of this application.

We claim:

1. A computer-implemented method for identifying users of an information security system for determining risk of unauthorized access to secure data assets, the method executed by one or more processors programmed to perform the method, the method comprising:

identifying, by one or more processors, a plurality of users, wherein each user has a job function related to a role of the user within an organization and is associated with an organizational network which contains a plurality of secure data assets and a plurality of security groups, each security group having permission to access at least one secure data asset;

for each of the plurality of users:
causing, by the one or more processors, a node of a graph data structure representing the user to be displayed on a user interface of a computing device,
identifying, by the one or more processors, a connection between the node of the user and a node of another user of the plurality of users when the user and the other user both correspond to a same security group of the plurality of security groups; and
causing, by the one or more processors, the connection between the corresponding node for the user and the other user to be displayed as an edge of the graph data structure on the user interface; and determining, by the one or more processors, a shortest path between each pair of nodes of the plurality of nodes based upon the connections between the nodes, wherein the shortest path between a pair of nodes is a least number of interconnected nodes in which a first node must pass through to reach a second node;

ranking, by the one or more processors, each of the plurality of users based upon a number of shortest paths which include the corresponding node for the respective user;

providing, by the one or more processors, the ranking of the plurality of users to the computing device; and determining, by the one or more processors, that at least one of the plurality of users ranked above a threshold ranking belongs to at least two different security groups to determine users having a potential security risk.

2. The method of claim 1, further comprising:
for each of a plurality of subsets of the plurality of nodes, clustering, by the one or more processors, the subset on the user interface to indicate that users in the subset belong to a same security group;
determining, by the one or more processors, that a node corresponding to a user which is connected to at least two other nodes in two different clusters has a potential security risk; and
identifying, by the one or more processors, the node corresponding to the user which is connected to at least two other nodes corresponding to at least two of the plurality of clustered subsets.

3. The method of claim 2, further comprising:
highlighting, by the one or more processors, the identified node and respective connections to the at least two other nodes corresponding to the unique combination of different security groups to identify the user that presents a risk of having unauthorized access to secure data assets.

4. The method of claim 2, wherein clustering the subset on the user interface to indicate that users in the subset belong to the same security group includes:
identifying, by the one or more processors, a clustering coefficient for the subset indicating that users in the subset belong to the same security group; and
clustering, by the one or more processors, the subset on the user interface in accordance with the clustering coefficient.

5. The method of claim 4, wherein clustering the subset in accordance with the clustering coefficient includes clustering the subset in proportion to the clustering coefficient so that a proximity of each node in the subset to each of the other nodes in the subset is in proportion to the clustering coefficient.

6. The method of claim 1, further comprising:
for each of the plurality of nodes:
determining, by the one or more processors, a betweenness centrality for the particular node, wherein the betweenness centrality is based upon a number of shortest paths which include the particular node wherein the particular node is not the first node or the second node.

7. The method of claim 6, further comprising increasing, by the one or more processors, a size of each node in the plurality of nodes based upon the determined betweenness centrality for each node.

8. The method of claim 6, further comprising removing, by the one or more processors, a user from one or more of the corresponding security groups for the user, when the betweenness centrality for the user is greater than a predetermined threshold.

9. The method of claim 1, further comprising:
generating, by the one or more processors, a set of indicators, each indicator identifying a different job function corresponding to the plurality of users; and
for each of the plurality of nodes, causing, by the one or more processors, the indicator identifying the job function of the corresponding user to be displayed with the node on the user interface.

10. A system for identifying users of an information security system for determining risk of unauthorized access to secure data assets, the system comprising:
one or more processors; and
a non-transitory computer-readable memory coupled to the one or more processors and storing thereon instructions that, when executed by the one or more processors, cause the system to:
identify a plurality of users, wherein each user has a job function related to a role of the user within an organization and is associated with an organizational network which contains a plurality of secure data assets and a plurality of security groups, each security group having permission to access at least one secure data asset,
for each of the plurality of users:
cause a node of a graph data structure representing the user to be displayed on a user interface of a computing device,
identify a connection between the node of the user and a node of another user of the plurality of users when the user and the other user both correspond to a same security group of the plurality of security groups,
cause the connection between the corresponding node for the user and the other user to be displayed as an edge of the graph data structure on the user interface, and
determine a shortest path between each pair of nodes of the plurality of nodes based upon the connections between the nodes, wherein the shortest path between a pair of nodes is a least number of interconnected nodes in which a first node must pass through to reach a second node;
rank each of the plurality of users based upon a number of shortest paths which include the corresponding node for the respective user;
provide the ranking of the plurality of users to the computing; and
determine that at least one of the plurality of users ranked above a threshold ranking belongs to at least two different security groups to determine users having a potential security risk.

11. The system of claim 10, wherein the instructions further cause the system to:

for each of a plurality of subsets of the plurality of nodes, cluster the subset on the user interface to indicate that users in the subset belong to a same security group;

determine that a node corresponding to a user which is connected to at least two other nodes in two different clusters has a potential security risk; and identify the node corresponding to the user which is connected to at least two other nodes corresponding to at least two of the plurality of clustered subsets.

12. The system of claim 11, wherein the instructions further cause the system to:

highlight the identified node and respective connections to the at least two other nodes corresponding to the unique combination of different security groups to identify the user that presents a risk of having unauthorized access to secure data assets.

13. The system of claim 11, wherein to cluster the subset on the user interface to indicate that users in the subset belong to the same security group, the instructions cause the system to:

identify a clustering coefficient for the subset indicating that users in the subset belong to the same security group; and cluster the subset on the user interface in accordance with the clustering coefficient.

14. The system of claim 13, wherein to cluster the subset in accordance with the clustering coefficient, the instructions cause the system to cluster the subset in proportion to the clustering coefficient so that a proximity of each node in the subset to each of the other nodes in the subset is in proportion to the clustering coefficient.

15. The system of claim 10, wherein the instructions further cause the system to:

for each of the plurality of nodes:

determine a betweenness centrality for the particular node, wherein the betweenness centrality is based upon a number of shortest paths which include the particular node wherein the particular node is not the first node or the second node.

16. The system of claim 15, wherein the instructions further cause the system to increase a size of each node in the plurality of nodes based upon the determined betweenness centrality for each node.

17. The system of claim 15, wherein the instructions further cause the system to remove a user from one or more of the corresponding security groups for the user, when the betweenness centrality for the user is greater than a predetermined threshold.

18. The system of claim 10, wherein the instructions further cause the system to:

generate a set of indicators, each indicator identifying a different job function corresponding to the plurality of users, and for each of the plurality of nodes, cause the indicator identifying the job function of the corresponding user to be displayed with the node on the user interface.

* * * * *